(12) United States Patent  (10) Patent No.: US 8,016,324 B2
Gutierrez-Lemini et al.  (45) Date of Patent: Sep. 13, 2011

(54) TWO-ELEMENT TANDEM FLEXIBLE JOINT

(75) Inventors: Danton Gutierrez-Lemini, Grand Prairie, TX (US); Todd M. Pottorff, Crowley, TX (US); George W. Peppel, Corsicana, TX (US); James G. Patrick, Azel, TX (US); Carl C. Spicer, Grand Prairie, TX (US); Jesner H. Pereira, Arlington, TX (US); Gregory P. Cruse, Arlington, TX (US)

(73) Assignee: Oil States Industries, Inc., Arlington, TX (US)

( * ) Notice: Subject to any disclaimer, the term of this patent is extended or adjusted under 35 U.S.C. 154(b) by 534 days.

(21) Appl. No.: 12/036,738

(22) Filed: Feb. 25, 2008

(65) Prior Publication Data

US 2009/0212557 A1 Aug. 27, 2009

(51) Int. Cl.
*F16L 27/103* (2006.01)
*F16L 27/10* (2006.01)
(52) U.S. Cl. .............. 285/223; 285/146.3; 285/263
(58) Field of Classification Search .......... 285/49, 285/146.3, 223, 224, 225, 226, 227, 228, 285/234, 263; 405/195.1
See application file for complete search history.

(56) References Cited

U.S. PATENT DOCUMENTS

| | | | |
|---|---|---|---|
| 2,900,182 A | 8/1959 | Hinks | |
| 3,429,622 A | 2/1969 | Lee et al. | |
| 3,519,260 A | 7/1970 | Irwin | |
| 3,555,590 A | 1/1971 | Halopoff | |
| 3,680,895 A | 8/1972 | Herbert et al. | |
| 3,734,546 A | 5/1973 | Herbert et al. | |
| 3,941,433 A | 3/1976 | Dolling et al. | |
| 3,958,840 A | 5/1976 | Hickox et al. | |
| 4,068,864 A | 1/1978 | Herbert et al. | |
| 4,068,868 A | 1/1978 | Ohrt | |
| 4,081,660 A | 3/1978 | Uffer et al. | |

(Continued)

FOREIGN PATENT DOCUMENTS

WO 2009108642 A1 9/2009

OTHER PUBLICATIONS

"Steel Catenary Riser FlexJoint," Internet web page at oilstates.com, 2007, one page, Oil States Industries, Inc., Arlington, Tx.

(Continued)

*Primary Examiner* — James Hewitt
(74) *Attorney, Agent, or Firm* — Richard Auchterlonie; Novak Druce & Quigg, LLP

(57) ABSTRACT

A flexible joint has an extension mounted to a housing for relative angular displacement. Two or more annular elastomeric flex elements are stacked in a co-axial fashion and joined mechanically to mount the extension to the housing so that the flex elements react in parallel to angular and axial displacements of the extension with respect to the housing so that tensile load upon the extension places each of the flex elements in compression to split and share the tensile load among the flex elements in proportion to their relative axial stiffnesses. Therefore, for a given housing size or footprint, the overall load capacity is increased, and the lifetime of the flexible joint is increased for a given load capacity. The flex elements may have a common center of rotation, and the flex elements may be disposed either on the same side of the center of rotation or on opposite sides.

26 Claims, 14 Drawing Sheets

U.S. PATENT DOCUMENTS

| | | | |
|---|---|---|---|
| 4,098,527 A * | 7/1978 | Herbert et al. | 285/146.3 |
| 4,103,939 A | 8/1978 | Herbert et al. | |
| 4,105,266 A | 8/1978 | Finney | |
| 4,121,861 A * | 10/1978 | Gorndt | 285/223 |
| 4,173,360 A | 11/1979 | Bergman et al. | |
| 4,183,556 A * | 1/1980 | Schwemmer | 285/51 |
| 4,263,243 A | 4/1981 | Wilson et al. | |
| 4,324,194 A | 4/1982 | Elliston | |
| 4,416,473 A | 11/1983 | Lamy et al. | |
| 4,515,399 A * | 5/1985 | Sullivan et al. | 285/95 |
| 4,570,979 A | 2/1986 | Moore | |
| 4,593,941 A * | 6/1986 | Whightsil, Sr. | 285/145.5 |
| 4,706,998 A * | 11/1987 | Peppel et al. | 285/146.3 |
| 4,708,758 A | 11/1987 | McGregor | |
| 4,759,662 A | 7/1988 | Peppel | |
| 4,784,410 A | 11/1988 | Peppel et al. | |
| 4,797,639 A | 1/1989 | Driscoll | |
| 4,984,827 A | 1/1991 | Peppel et al. | |
| 5,133,578 A | 7/1992 | Whightsil, Sr. et al. | |
| 5,269,629 A | 12/1993 | Langner | |
| 5,482,406 A | 1/1996 | Arlt, III | |
| 5,615,977 A * | 4/1997 | Moses et al. | 405/195.1 |
| 5,641,248 A | 6/1997 | Arlt, III | |
| 5,791,695 A | 8/1998 | Snider | |
| 5,905,212 A | 5/1999 | Moses et al. | |
| 5,951,061 A | 9/1999 | Arlt, III et al. | |
| 6,739,804 B1 | 5/2004 | Haun | |
| 6,789,790 B2 | 9/2004 | Speckhart et al. | |
| 7,063,292 B2 | 6/2006 | Perez-Sanchez | |
| 7,167,412 B2 | 1/2007 | Tenghamn | |
| 7,341,283 B2 | 3/2008 | Moses et al. | |
| 7,529,089 B2 | 5/2009 | Cheng | |
| 2009/0156341 A1 | 6/2009 | Gaynor | |
| 2009/0212558 A1 | 8/2009 | Gutierrez-Lemini et al. | |

OTHER PUBLICATIONS

"SCR Sizes," Internet web page at oilstates.com, 2007, one page, Oil States Industries, Inc., Arlington, Tx.

"SCR Features," Internet web page at oilstates.com, 2007, one page, Oil States Industries, Inc., Arlington, Tx.

"Tendon Systems," Internet web page at oilstates.com, 2007, one page, Oil States Industries, Inc., Arlington, Tx.

"FlexJoint Tendon Bearing," Internet web page at oilstates.com, 2007, one page, Oil States Industries, Inc., Arlington, Tx.

"SCR Key Slot Receptacle," Internet web page at oilstates.com, 2007, one page, Oil States Industries, Inc., Arlington, Tx.

International Search Report, International Application No. PCT/US2009/035025, Aug. 13, 2009, 5 pages, European Patent Office, Rijswijk, The Netherlands.

Written Opinion of the International Searching Authority, International Application No. PCT/US2009/035025, Aug. 13, 2009, 5 pages, European Patent Office, Munich, Germany.

Giovanni, Vecchio, "Written Opinion of the International Searching Authority," for PCT/US2009/035025, as transmitted by the International Bureau of WIPO, 7 pages, Sep. 10, 2010, Geneva, Switzerland.

Benenson, Walter, et al., Handbook of Physics, pp. 54-55, 2002, Springer-Verlag New York inc., New York, NY.

Cha, Philip D., et al., Fundamentals of Modeling and Analyzing Engineering Systems, pp. 29-33, 2000, Cambridge University Press, Cambridge, UK.

Lobontiu, Nicolae, et al., Mechanics of Micromechanical Systems, pp. 271-272, 2005, Kluwer Academic Publishers, Springer Science +Business Media, Inc., New York, NY.

Supplemental Instructions Torsion Spring Installation, 4 pages, Jun. 28, 2004, Coplay Building Products, Griffon Corporation, New York, NY.

ZBD6890K11—GE Monogram Fully Integrated Built-In Dishwasher, 4 pages, Oct. 2006, General Electric Company, Fairfield, CT.

Webster's Seventh New Collegiate Dictionary, pp. 610-611, 723, 792, 1965, G. & . C. Merriman Company, Springfield, MA.

Auchterlonie, Richard, Informal Comments on the Written Opinion of the International Searching Authority, International application No. PCT/US2009/035025, Oct. 9, 2009, 6 pages, The International Bureau of WIPO, Geneva, Switzerland.

Hewitt, James, Office Action, U.S. Appl. No. 12/196,230, Jan. 14, 2001, 18 pages, U.S. Patent and Trademark Office, Arlington, VA.

John Anderson & Dennis Gay, "Physics Lab Module 4, Series and Parallel DC Circuits," Apr. 5, 2009, pp. 4-1 to 4-12, University of North Florida, Jacksonville, Florida.

Igor Glozman, "Heat Transfer," Physics class notes, Feb. 11, 2011, 3 pages, Highline Community College, DesMoines, Washington.

Webster's Seventh New Collegiate Dictionary, 1965, pp. 191, 303, and 780, G. & C. Merriam Co., Springfield, Mass.

* cited by examiner

TWO-ELEMENT TANDEM FLEXIBLE JOINT

FIELD OF THE INVENTION

The present invention relates to a flexible joint having an extension extending from a housing, and more than one annular elastomeric flex element for mounting the extension to the housing for permitting angular displacement of the extension with respect to the housing.

BACKGROUND OF THE INVENTION

Flexible joints having an annular elastomeric flex element mounting an extension to a housing are used for reducing motion-induced stresses between floating offshore facilities and risers and tendons depending from the floating offshore facilities. Typically the flex element consists of alternating spherical shims of metal, or other stiff material, and layers of elastomeric material. Such a flex element is capable of providing a free angular displacement of about ±15 degrees or more while supporting an axial tension proportional to the size of the flex element. Typically the size of the flex element has been selected to handle the desired load upon the riser or tendon, and flex elements have been manufactured and stocked in various sizes for handling various standard sizes of risers or tendons.

Risers are used for transfer of production fluids from the sea floor up to a deck of a floating offshore vessel, and for transfer of the production fluid off the vessel to one or more export lines. The loads impressed by the riser on a flex element typically consist of tension in the riser, angular displacement and rotation of the riser, internal pressure in the production fluid, and increased temperature from the production fluid. Thus, the internal pressure in the production fluid, and increased temperature from the production fluid, may make the selection of a flex element for a riser more difficult than the selection of a flex element for a tendon.

For various applications, flexible pipe joints have incorporated more than one flex element in a common housing. For example, a double-ended flexible pipe joint for a riser has a first flex element in the housing for mounting a first extension pipe to the housing, and a second flex element in the housing for mounting a second extension pipe to the housing. The two extension pipes extend in opposite directions from the common housing. In this fashion, the double-ended flexible pipe joint can accommodate twice the angular displacement than can be tolerated by a single-ended flexible pipe joint having a single flex element. The angular displacement is divided between the two flex elements in the double-ended flexible pipe joint, but each of the two flex elements carries the same full tension of the riser. Examples of such double-ended flexible pipe joint are found in Herbert et al. U.S. Pat. No. 3,680,895 issued Aug. 1, 1972; Herbert et al. U.S. Pat. No. 4,068,864 issued Jan. 17, 1978 (see FIG. 4); and Whightsil, Sr. et al. U.S. Pat. No. 5,133,578 issued Jul. 28, 1992.

Flexible pipe joints have incorporated more than one flex element in a common housing so that two flex elements are subjected to the same angular displacement yet only one of these two flex elements carries the tensile load upon the flexible pipe joint. Such an arrangement may reduce pressure from production fluid on each flex element and provide both a primary and a backup sealing mechanism for containing the pressurized production fluid within the pipe joint. However, the flex elements in these concepts need to be pre-compressed for proper functioning; a fact that reduces the usable life of the flex elements. Thus, these designs make an inefficient use of the two flex elements both to carry the axial load upon the pipe and to seal the pressure. Examples of such flexible pipe joints are found in Schwemmer U.S. Pat. No. 4,183,556 issued Jan. 15, 1980, and Ohrt U.S. Pat. No. 4,068,868 issued Jan. 17, 1978.

Flexible pipe joints having more than one flex element in a common housing have also been used to provide a coaxial dual-lumen riser. For example, as described in Peppel et al. U.S. Pat. No. 4,784,410 issued Nov. 15, 1988 and in Peppel et al. U.S. Pat. No. 4,984,827 issued Jan. 15, 1991, within a flexible pipe joint, at least two concentric and separate passages are formed for conveying fluids through the flexible pipe joint. The passages are said to remain separate and essentially unchanging in cross-section throughout the entire range of pivotal motion of the flexible pipe joint. However, in each of the several versions disclosed in Peppel et al. U.S. Pat. Nos. 4,784,410 and 4,984,827, the flex elements in the common housing are forced by connecting rings to react in parallel to a common angular displacement, thus assuring the cross sections of the passages to remain essentially unchanged during rotation of the joint, but are uncoupled axially such that tensile load upon the flexible joint is carried by one flex element only.

SUMMARY OF THE INVENTION

The inventors have discovered that it is desirable to stack two or more annular elastomeric flex elements in a co-axial fashion in a flexible joint and to join the flex elements mechanically to mount the extension of the flexible joint to the housing so that the flex elements react in parallel to both the angular and axial displacements of the extension with respect to the housing so that both elements rotate the same amount and the tensile load upon the extension with respect to the housing places each of the flex elements in compression to split and share the tensile load among the flex elements. Therefore, for a given housing size or footprint, the overall load capacity of the flexible joint is increased, and the usable lifetime of the flexible joint is increased for a given load capacity.

The stacked flex elements need not have the same geometry or be made of the same materials, nor do the stacked flex elements need to be pre-compressed for their proper functioning. In general, the total applied load will be split among the stacked flex elements in proportion to the relative stiffnesses of the stacked flex elements. For example, the stacked flex elements may have the same geometry and may be made of the same materials and may be disposed the same way about a common center of rotation so that the stacked flex elements have the same relative stiffnesses and therefore the total applied load will be split equally among the stacked flex elements. In another example, the stacked flex elements have a different geometry or are made of different materials or are disposed in a different way about a common center of rotation so that the stacked flex elements have different relative stiffness and the total applied load is split unequally among the stacked flex elements in proportion to their relative stiffnesses.

In accordance with a first aspect, the invention provides a flexible joint including an outer housing, an extension extending from the outer housing, a first annular elastomeric flex element mounting the extension to the outer housing for angular displacement of the extension with respect to the outer housing, and at least a second annular elastomeric flex element coupled between the extension and the outer housing. The first and second flex elements are stacked in a coaxial fashion and are mechanically joined so that the first and second flex elements react in parallel to angular and axial displacements of the extension with respect to the outer housing so that tensile load upon the extension with respect to the outer housing places each of the first and second flex elements in compression to split and share the tensile load among the first and second flex elements in proportion to relative axial stiffnesses of the first and second flex elements.

In accordance with another aspect, the invention provides a flexible pipe joint including an outer housing, an attachment flange, an extension pipe, a first annular elastomeric flex element, an inner pipe, and a second annular elastomeric flex element. The outer housing has a first end and a second end. The attachment flange is mounted to the first end of the outer housing. The extension pipe extends from the second end of the outer housing. The first flex element is disposed within the outer housing and mounts the extension pipe to the outer housing for angular displacement of the extension pipe with respect to the outer housing. The extension pipe passes through the first flex element so that the first flex element encircles the extension pipe. The inner pipe is disposed within the outer housing and is mounted to the attachment flange and provides a channel from an aperture in the attachment flange to the extension pipe for passage of fluid through the flexible pipe joint. The inner housing is disposed within the outer housing and is affixed to the extension pipe. The second flex element is disposed within the outer housing and disposed within the inner housing and mounts the inner pipe to the inner housing. The inner pipe passes through the second flex element so that the second flex element encircles the inner pipe. The first and second flex elements are stacked in a coaxial fashion and are mechanically joined so that the first and second flex elements react in parallel to angular and axial displacements of the extension pipe with respect to the outer housing so that tensile load upon the extension pipe with respect to the outer housing places each of the first and second flex elements in compression to split and share the tensile load among the first and second flex elements in proportion to relative axial stiffnesses of the first and second flex elements.

In accordance with yet another aspect, the invention provides a flexible pipe joint including an outer housing, an attachment flange, an extension pipe, a first annular elastomeric flex element, and a second annular elastomeric flex element. The outer housing has a first end and a second end. The attachment flange is mounted to the first end of the outer housing. The extension pipe extends from the second end of the outer housing. The first flex element is disposed within the outer housing and mounts the extension pipe to the outer housing for angular displacement of the extension pipe with respect to the outer housing. The extension pipe passes through the first flex element so that the first flex element encircles the extension pipe. The second annular elastomeric flex element is disposed within the outer housing and mounts the extension pipe to the outer housing. The extension pipe passes through the second flex element so that the second flex element encircles the extension pipe. The attachment flange defines an aperture for a channel to the extension pipe for passage of fluid through the flexible pipe joint. The first and second flex elements are stacked in a coaxial fashion and are mechanically joined so that the first and second flex elements react in parallel to angular and axial displacements of the extension pipe with respect to the outer housing so that tensile load upon the extension pipe with respect to the outer housing places each of the first and second flex elements in compression to split and share the tensile load among the first and second flex elements in proportion to relative axial stiffnesses of the first and second flex elements.

BRIEF DESCRIPTION OF THE DRAWINGS

Additional features and advantages of the invention will be described below with reference to the drawings, in which.

Figure 1:
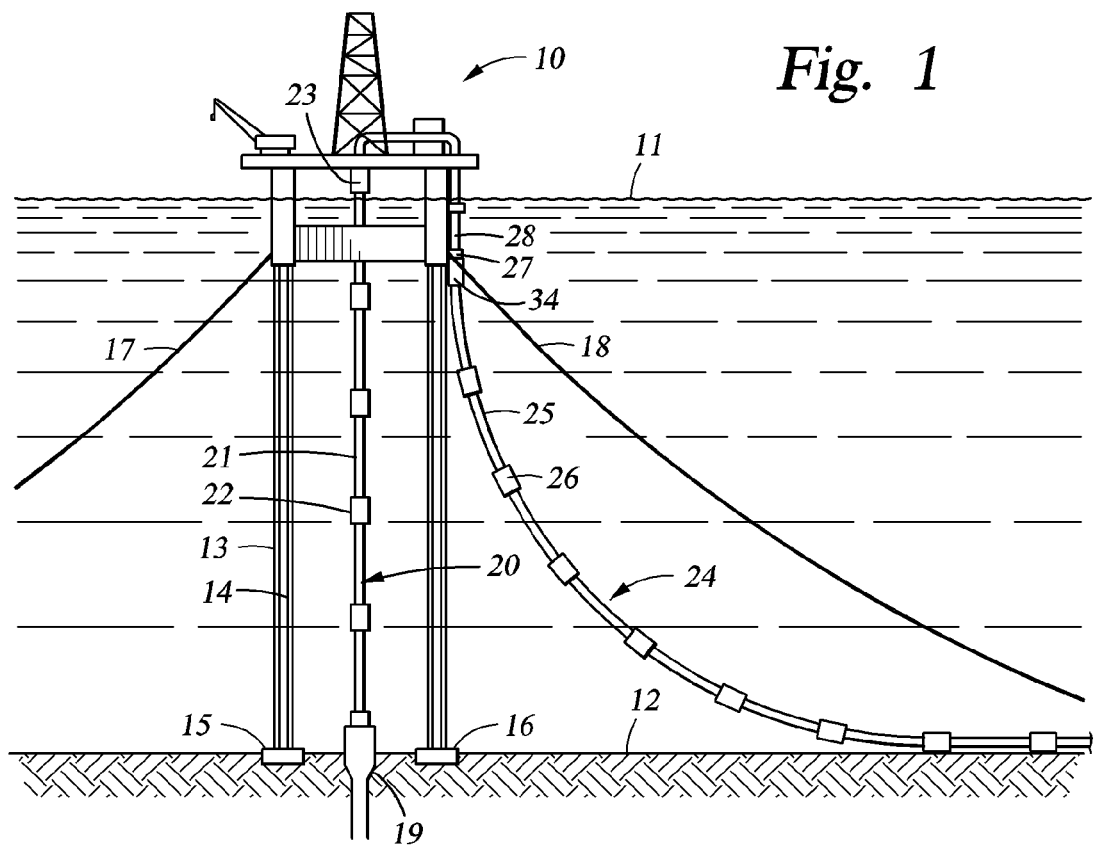
FIG. 1 is a schematic diagram of a tension leg platform (TLP) including a production riser and an export riser in a catenary configuration.

While the invention is susceptible to various modifications and alternative forms, specific embodiments thereof have been shown in the drawings and will be described in detail. It should be understood, however, that it is not intended to limit the invention to the particular forms shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown an offshore drilling and production vessel generally designated 10 floating on a water surface 11. The floating vessel in particular is a tension leg platform (TLP) secured to the seabed 12 by means of tendons 13, 14 and foundation templates 15, 16. Although not visible in FIG. 1, there is a set of tendons depending from each of four corners of the TLP platform 10 to a respective one of four foundation templates 15, 16. In addition, each of the four lower corners of the TLP platform 10 is secured by a respective lateral mooring line 17, 18 used to move the platform laterally and to resist lateral storm loadings.

For conveying drilling fluids and a drill string from the TLP to a well bore 19 in the seabed 12, and for removing hydrocarbons from the well when drilling has been completed, a production riser generally designated 20 extends from the well bore 19 up to the TLP 10. The riser 20 consists of a number of rigid pipe sections 21 joined by flexible pipe joints 22. A suitable flexible pipe joint is described, for example, in Whightsil, Sr. et al. U.S. Pat. No. 5,133,578 issued Jul. 28, 1992, incorporated herein by reference.

Also shown in FIG. 1 is an export riser generally designated 24 hanging from a leg of the TLP 10 in a catenary configuration and touching down on the seabed 12. The export riser 24, for example, is a pipeline from the TLP 10 to an on-shore facility (not shown), or to a buoy system for loading floating production storage and offloading vessels (FPSO's). The export riser 24 is similar to the production riser 20 in that it is comprised of a number of rigid pipe sections 25 joined by elastomeric flexible pipe joints 26. A flexible pipe joint 27 at the top of the riser 24 is mounted in a side entry slotted receptacle 34 attached to a leg of the TLP 10.

Figure 2:
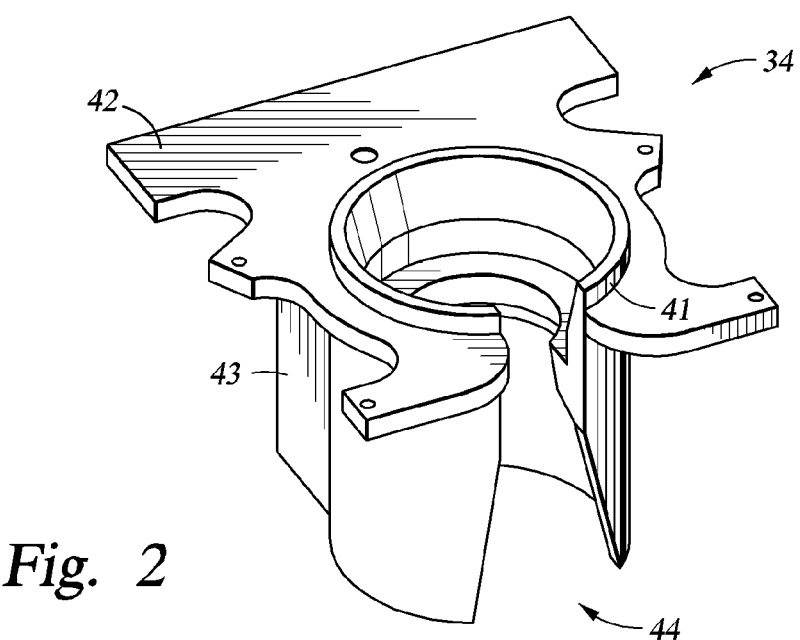
FIG. 2 is a side entry slotted receptacle for mounting the export riser to the TLP in FIG. 1.

FIG. 2 shows the side entry slotted receptacle 34. The receptacle 34 is a weldment consisting of a forged, machined load ring 41 and a number of plates 42, 43. The plates 42, 43, performing as webs and flanges, serve to stabilize the load ring 41 as well as bridge loads between the TLP leg and the export riser.

During installation, the rear portion of the receptacle 34 is welded or otherwise secured to the leg of the TLP, and the upper flexible pipe joint of the export riser is inserted into the load ring 41. The receptacle includes a front slot generally designated 44 for ease of side entry of the export riser during installation.

Flexible joints for risers and for mounting tendons to a TLP have been manufactured and stocked in various sizes for handling various standard sizes of risers or tendons. However, situations may arise where it would be desirable to increase the load bearing capacity or useable lifetime of a flexible joint for a given housing size or footprint. This is especially true for the uppermost flexible pipe joint of a riser, because this flexible joint is typically mounted to a floating vessel having a mounting receptacle matched to a particular housing footprint.

For example, initially a mounting receptacle is selected and sized for anticipated service conditions, and then the mounting receptacle is welded to the floating vessel. If the service conditions would change, then it may be difficult to replace the mounting receptacle and expensive to install a new mounting receptacle. The loading conditions may need to be increased because a new or deeper well has been drilled at an existing site so that higher temperature production fluid is to be extracted at the existing site, or the loading conditions may need to be increased because production at an existing site has been terminated and the floating vessel has been moved to a new site where the seabed is deeper so that the flexible pipe joint must handle a higher tension. In either case, it would be desirable to install a new, higher capacity flexible pipe joint in the existing mounting receptacle.

In accordance with an aspect of the present invention, the load bearing capacity or useable lifetime of a flexible joint for a given housing size or footprint is increased by stacking two or more annular elastomeric flex elements in a co-axial fashion in a flexible joint and joining the elastomeric flex elements mechanically to mount an extension of the flexible joint to the housing so that the flex elements react in parallel to both angular and axial displacement of the extension with respect to the housing, and in particular, so that tensile load upon the extension with respect to the housing places each of the flex elements in compression to split and share the tensile load among the flex elements. Therefore, for a given housing size or footprint, the overall load capacity of the flexible joint is increased, and the usable lifetime of the flexible joint is increased for a given load capacity. The flexible pipe joint with the flex elements acting in parallel may operate in a much harsher environment and under more severe conditions than is possible with an existing single element design, or a design featuring two flex elements which either act independently, or are joined to act in series.

In a preferred configuration, the stacked flex elements acting in parallel are positioned about a common center of rotation. For two stacked flex elements acting in parallel, this can be done either by locating the flex elements on opposite sides of the center of rotation so that the center of rotation is located between the flex elements, or by locating the flex elements on the same side of the center of rotation so that the center of rotation is not located between the flex elements. For the case of the two flex elements being located on opposite sides of the center of rotation, the two flex elements can be mechanically joined to the extension by an inner housing or by extending the extension so that it is encircled by each of the two flex elements. Thus, there are three general flexible joint configurations for the case of two stacked flex elements acting in parallel.

Figure 3:
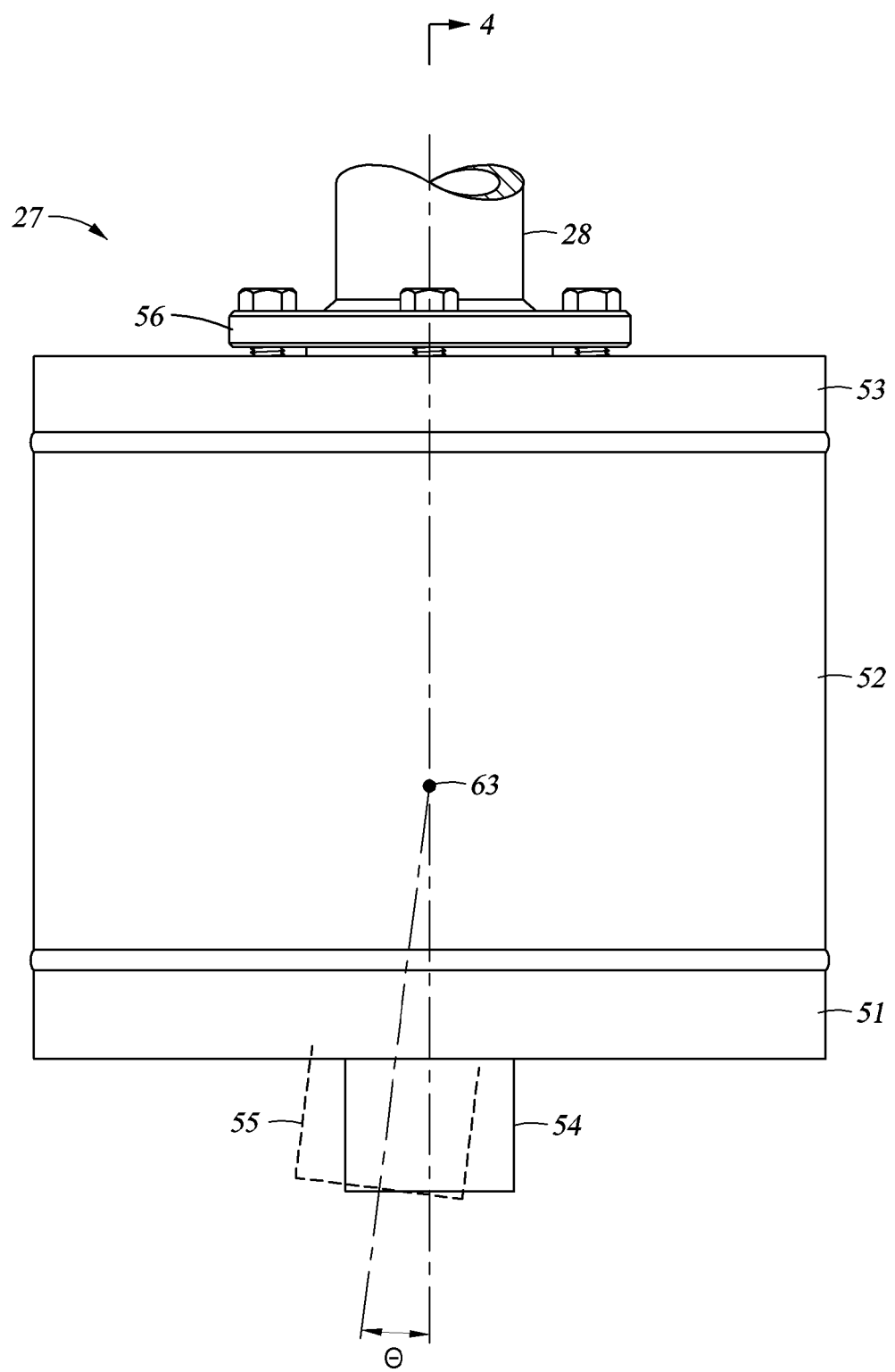
FIG. 3 is a front view of a flexible pipe joint having a first configuration in accordance with the preset invention.
Figure 4:
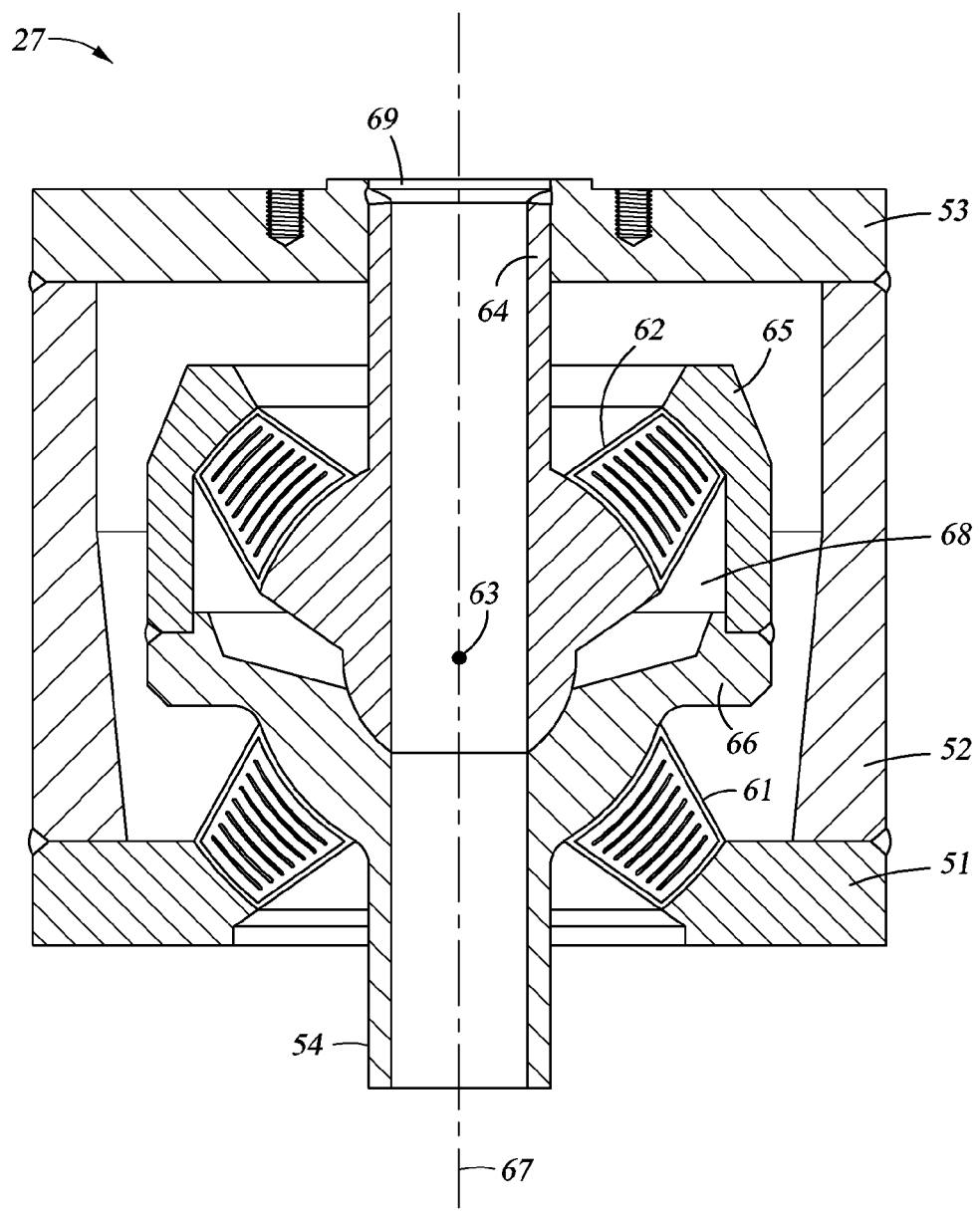
FIG. 4 is a lateral cross-section of the flexible pipe joint along line 4-4 in FIG. 3.

FIGS. 3 and 4 show a flexible pipe joint 27 having the general configuration in which two stacked flex elements 61, 62 acting in parallel are located on opposite sides of a common center of rotation 63. In this specific embodiment, the flexible pipe joint 27 has a lower support ring 51, a cylindrical body 52, a lower flex element 61, an extension pipe 54, an inner housing 65, an upper flex element 62, an inner pipe 64, and an attachment flange 53. The upper flange 66 of the extension pipe 54 is welded to the inner housing 65, and the inner pipe 64 is welded to the attachment flange 53. Also, the attachment flange 53 is welded to the cylindrical body 52. For example, these welded components are made of a corrosion resistant steel alloy.

When in use, the flexible pipe joint 27 is seated into a captive receptacle (34 in FIG. 2) that can support securely the weight and load of the flexible pipe joint 27. The attachment flange 53 is bolted to a flange (56 in FIG. 3) of a pipe segment (28 in FIG. 3) for conveying fluid through the flexible pipe joint between the pipe segment 28 and the extension pipe 54. The combination of the lower support ring 51 and the cylindrical body 52 provide an outer housing for the flexible pipe joint 27. When supporting a tensile load upon the extension pipe 54 with respect to this outer housing, the flexible pipe joint 27 permits a range of angular displacement ($\theta$) of the extension pipe 54 with respect to the outer hosing. For example, as shown in FIG. 3, an angular displacement ($\theta$) of the extension pipe 54 occurs when the extension pipe rotates about the center of rotation 63 from a vertical orientation as shown in solid lines to an inclined orientation 55 shown in dashed lines.

As shown in FIG. 4, the lower annular elastomeric flex element 61 and the upper annular elastomeric flex element 62 are stacked in a co-axial fashion along a central longitudinal axis 67 and are contained within the outer housing comprised of the lower support ring 51 and the cylindrical body 52. The stacked flex elements 61 and 62 have a common center of rotation 63 on the axis 67.

In the embodiment of FIG. 4, the upper flex element 62 need not have the same size, shape, or composition as the lower flex element 61. In general, when tension is applied to the extension pipe 54 causing displacement of the extension pipe with respect to the cylindrical body 52 along the axis 67, the upper flex element 62 and the lower flex element 61 are each subjected to the same axial displacement, and thus to compressive forces which are in proportion to the relative axial stiffnesses of the flex elements. Consequently, the tensile load upon the flexible joint 27 is split and shared among the upper and lower flex elements 62, 61 in proportion to their relative axial stiffnesses. Therefore, by incorporating the upper flex element 62 in the flexible pipe joint 27 and mechanically joining the upper flex element to the lower flex element 61 and to the extension pipe 54, the flexible pipe joint can handle more load than either flex element alone. For instance, by incorporating substantially identical upper and lower flex elements 62, 61 into the flexible pipe joint 27 and mechanically joining them in the manner of this embodiment, the flexible pipe joint would have twice the load capacity of the lower flex element alone.

In a similar fashion, angular displacement of the extension pipe 54 by rotation about the common center of rotation 63 subjects the upper flex element 62 and the lower flex element 61 to the same shear strain, and consequently the flexible pipe joint 27 provides an opposing force upon the extension pipe 54 that is the sum of the forces provided by the upper and lower flex elements 62, 61; which would be twice the force provided by either flex element if both flex elements 61, 62, were substantially identical.

In general, because the extension pipe 54 and the inner housing 65 are joined together, the upper flex element 62 and the lower flex element 61 are forced to react in parallel and to thus displace and rotate by the same amount. The upper flex element 62 and lower flex element 61 share the same center of rotation 63 so as to allow a range of unbinding angular displacement of the extension pipe 54 during use. Therefore, the total load (due to riser tension and rotation, fluid pressure, and thermal expansion) is distributed between the upper flex element 62 and the lower flex element 61 in proportion to their relative stiffnesses. The lower flex element 61 transfers its load directly into the lower support ring 51, while the upper flex element 62 transfers its load into the inner pipe 64. The inner pipe 64 then transfers that load into the attachment flange 53 through a welded connection. The attachment flange 53 transfers that load through another welded connection down to the lower support ring 51.

In use, when transferring production fluid from the floating vessel to the export riser (24 in FIG. 1), the production fluid flows down through an aperture 69 in the attachment flange 53 into the inner pipe 64 and fills an inner cavity 68. Then the production fluid flows from the inner pipe 64 down through the extension pipe 54.

It is also possible to use a flexible pipe joint as shown in FIG. 4 in the production riser (20 in FIG. 1). In this case, the production fluid from the well bore would flow up through the extension pipe 54, and then up through the inner pipe 64 and up through the attachment flange 53.

Construction of the flexible pipe joint 27 requires two assemblies to be molded separately. In one molding process, elastomer of the lower flex element 61 is bonded to the lower support ring 51 and to the extension pipe 54 using a split two-piece ring (not shown). When this molding process is completed, the two pieces of the split ring are taken apart from each other to remove the split ring from the molded assembly. Further details regarding a mold with such a split ring are found in FIG. 5 and column 5 line 47 to column 6 line 2 of McGregor U.S. Pat. No. 4,708,758 issued Nov. 24, 1987, incorporated herein by reference.

In a similar fashion, when the upper flex element 62 is molded, elastomer of the upper flex element is bonded to the inner pipe 64 and to the inner housing 65. In this case, however, there is no need for a split ring because the shapes of the inner pipe 64 and the inner housing 65 permit a solid conical ring to be used in the molding process.

The flexible pipe joint as shown in FIG. 4 is manufactured from the assembly of the lower flex element 61 and the assembly of the upper flex element 62 by placing the assembly of the upper flex element 62 upon the assembly of the lower flex element 61 and welding the inner housing 65 to the upper flange 66 of the extension pipe 54. At this time the cylindrical body 52 is absent so that this welding is unobstructed by the cylindrical body 52. Next, the cylindrical body 52 is placed on the lower support ring 51 and welded to the lower support ring. Then the attachment flange 53 is fitted upon the inner pipe 64, the inner pipe is welded to the attachment flange, and the attachment flange is welded to the cylindrical body 52.

Figure 5:
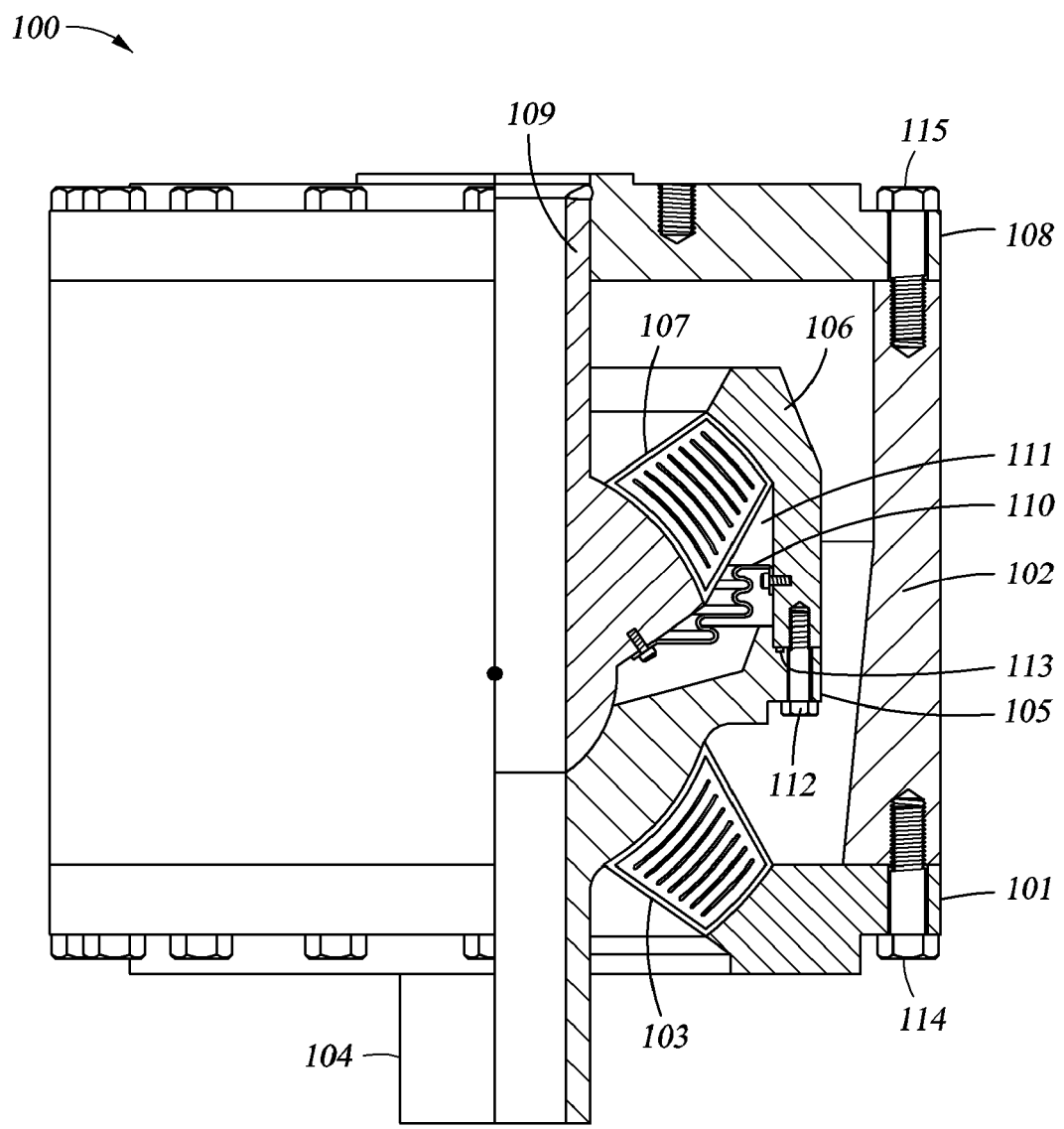
FIG. 5 shows an alternative construction for the flexible pipe joint of FIG. 4 to facilitate disassembly.

FIG. 5 shows an alternative construction for a flexible pipe joint 100 to facilitate disassembly. In this example, disassembly may be required for replacement of an internal bellows 110. The bellows 110 provides a non-diffusive barrier between production fluid conveyed through the flexible pipe joint 100 and elastomer of the upper flex element 107.

During construction of the flexible pipe joint 100, when the lower flex element 103 is molded, it becomes bonded to the lower support ring 101 and to the extension pipe 104. When the upper flex element 107 is molded, it becomes bonded to the inner housing 106 and to the inner pipe 109. Then the bellows 110 is attached to the inner housing 106 and to the inner pipe 109. Then the cavity 111 between the bellows 110 and the upper flex element 107 is filled with an incompressible fluid such as propylene glycol or polyalkylene glycol.

The assembly of the upper flex element 107 is then placed upon the assembly of the lower flex element 103, and the upper flange 105 of the extension pipe 104 is secured to the inner housing 106 by a series of bolts 112. An end ring metal gasket 113 seals the joint between the upper flange 105 of the extension pipe 104 and the inner housing 106. Then the cylindrical body 102 is placed upon the lower support ring 101 and secured to the lower support ring 101 by a series of bolts 114. Then the attachment flange 108 is fitted upon the inner pipe 109 and the inner pipe 109 is welded to the attachment flange 108. Then the attachment flange 108 is secured to the cylindrical body 102 by a series of bolts 115.

For disassembly, the bolts 115 are removed so that the attachment flange 108 is no longer secured to the cylindrical body 102. Then the weld between the inner pipe 109 and the attachment flange 108 is ground away so that the attachment flange can be removed from inner pipe. Then the bolts 114 are removed so that the cylindrical body 102 can be removed from the lower support ring 101. Then the bolts 112 are removed so that the assembly of the upper flex element 107 can be removed from the assembly of the lower flex element 103.

Figure 6:
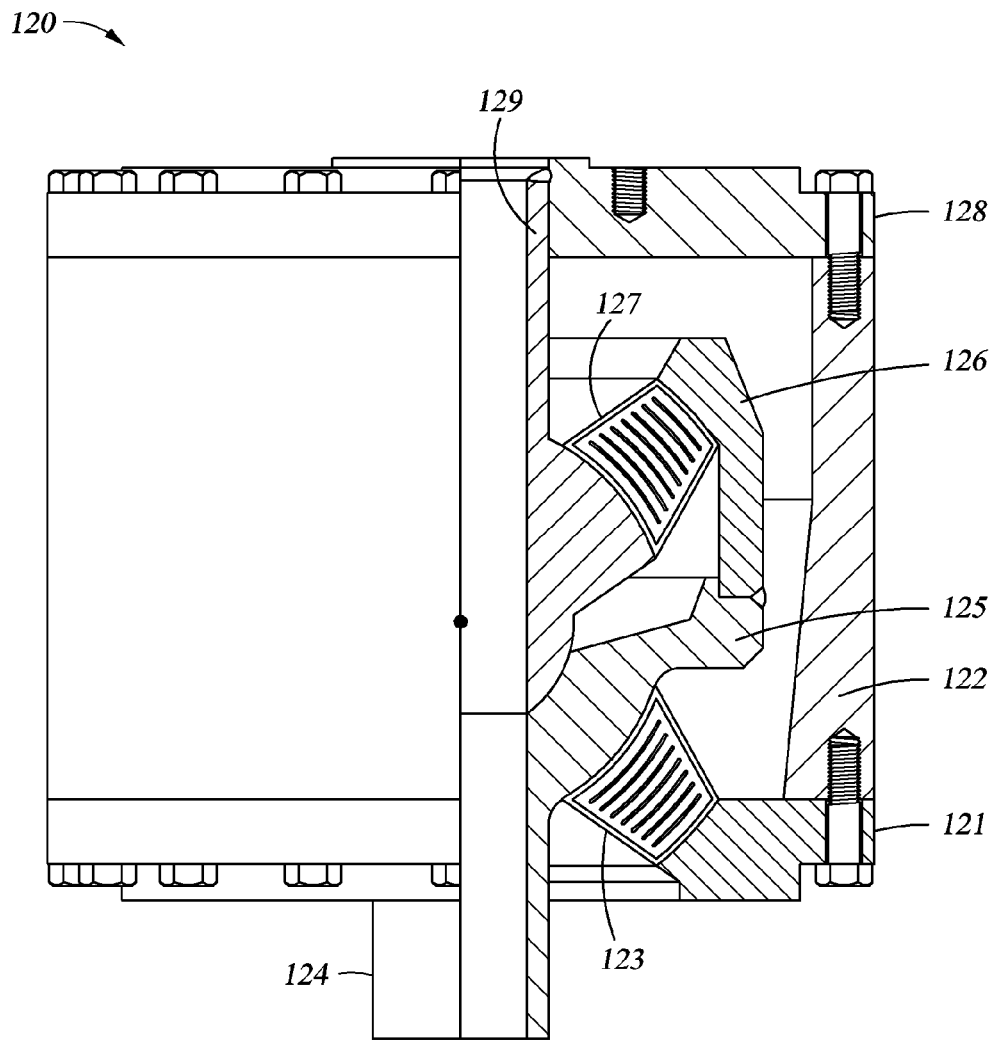
FIG. 6 shows another alternative construction for the flexible pipe joint of FIG. 4

FIG. 6 shows an alternative construction for a flexible pipe joint 120. In this example, the flexible pipe joint 120 includes a lower support ring 121, a cylindrical body 122, a lower flex element 123, an extension pipe 124, an inner housing 126, an upper flex element 127, an inner pipe 129, and an attachment flange 128. The upper flange 125 of the extension pipe 124 is welded to the inner housing 126, and the inner pipe 129 is welded to the attachment flange 128. The cylindrical body 122 is bolted to the lower support ring 121, and the attachment flange 128 is bolted to the cylindrical body.

The construction of the flexible pipe joint 120 facilitates partial disassembly by unbolting the attachment flange 128 from the cylindrical body 122, grinding away the weld between the attachment flange and the inner pipe 129, removing the attachment flange 128, and unbolting and removing the cylindrical body 122 from the lower support ring 121. Such partial disassembly may be desirable for inspection of the upper flex element 127 and the lower flex element 123, and for access to sensors embedded in the flex elements. For example, sensors embedded in a flex element are described in Moses, et al. U.S. Pat. No. 5,905,212 issued May 18, 1999.

Figure 7:
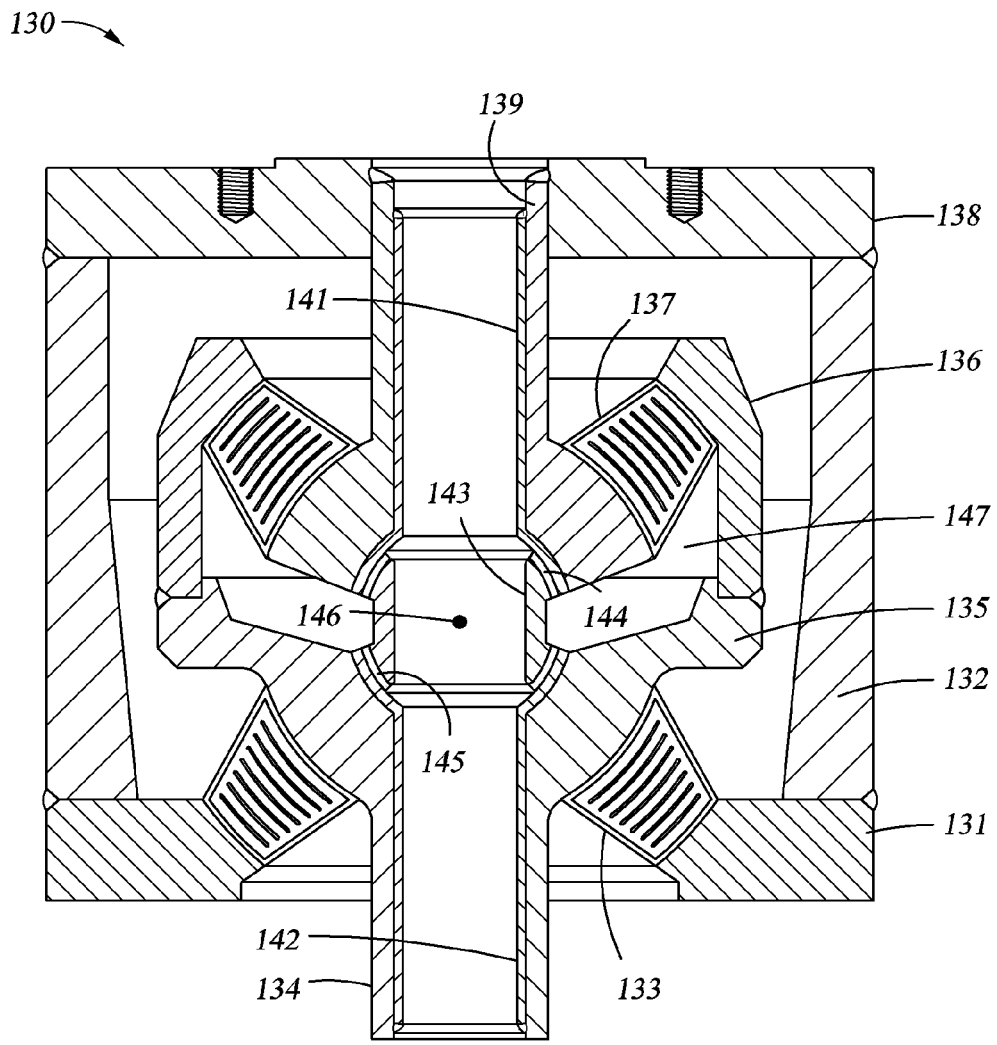
FIG. 7 shows another alternative construction for the flexible pipe joint of FIG. 4, featuring a pressure-sealing unit.

FIG. 7 shows a flexible pipe joint 130 further including an upper inner liner 141, a lower inner liner 142, and a centering ring 143. An upper secondary annular elastomeric flex element 144 is disposed between the centering ring 143 and the upper inner liner 141, and a lower secondary annular elastomeric flex element 145 is disposed between the centering ring and the lower inner liner 142. The assembly of the upper inner liner 141, the lower inner liner 142, the centering ring 143, the upper secondary annular elastomeric flex element 144, and the lower secondary annular elastomeric flex element 145, is molded together as a single unit.

During assembly of the flexible pipe joint 130, a lower primary flex element 133 is molded and bonded to a lower support ring 131 and to an extension pipe 134. An upper primary flex element 137 is molded and bonded to an inner housing 136 and to an inner pipe 139. Then the lower inner liner 142 of the liner assembly is inserted into the extension pipe 134, and the assembly of the upper primary flex element 137 is lowered into position with the inner pipe 139 fitted over the upper liner 141 of the liner assembly so that the upper liner 141 is inserted into the inner pipe 139 until the inner housing 136 becomes seated upon the upper flange 135 of the extension pipe 134. Then the inner housing 136 is welded to the upper flange 135 of the extension pipe 134. Then the lower end of the lower inner liner 142 is welded to the lower end of the extension pipe 134, and the upper end of the upper inner liner 141 is welded to the upper end of the inner pipe 139. Then the cylindrical body 132 is placed upon and welded to the lower support ring 131. Then the attachment flange 138 is fitted on the inner pipe 139 and placed upon the cylindrical body 132, and the upper end of the inner pipe is welded to the attachment flange. Then the attachment flange 138 is welded to the cylindrical body 132.

All of the flex elements 133, 137, 144, 145 of the flexible pipe joint 130 share the same center of rotation 146 so as to allow a range of unbinding angular displacement of the extension pipe 134 during operation. The secondary flex elements 144, 145, the centering ring 143, the upper liner 141, and the lower liner 142 isolate an inner cavity 147 from the production fluid. This, in turn, eliminates the resultant pressure head that would otherwise be introduced if the production fluid pressure were allowed into the inner cavity 147 and over to the primary flex elements 137 and 133. Thus, the assembly of the liners 141, 142 and the centering ring 143 and the secondary flex elements 144, 145 functions as a pressure-isolation unit, which creates a redundancy in the seals between the production fluid and the ambient conditions outside of the flexible pipe joint 130.

Figure 8:
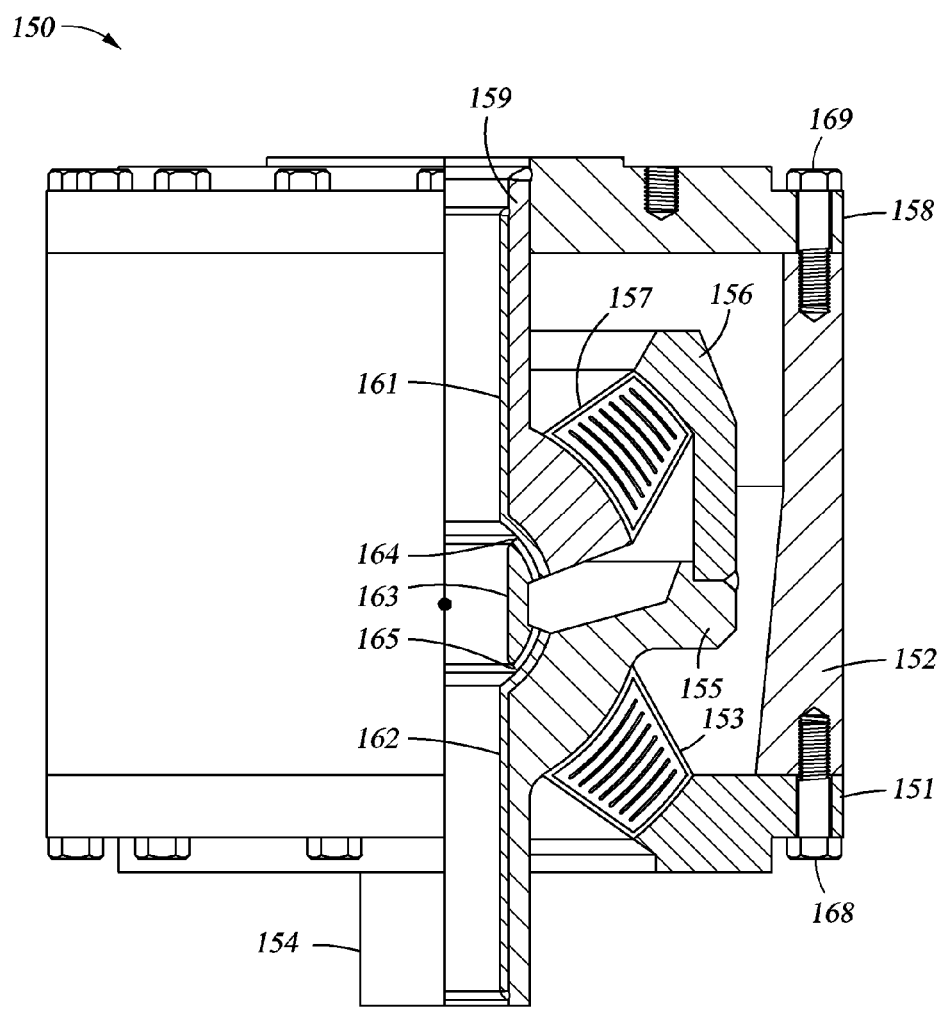
FIG. 8 shows an alternative construction for the flexible pipe joint of FIG. 7.

FIG. 8 shows a flexible pipe joint 150 having a construction similar to that shown in FIG. 7 but being constructed to facilitate partial disassembly. The flexible pipe joint 150 includes a lower support ring 151, a cylindrical body 152, a lower primary flex element 153, an extension pipe 154, an inner housing 156, an upper primary flex element 157, an attachment flange 158, an inner pipe 159, an upper inner liner 161, a lower inner liner 162, a centering ring 163, an upper secondary flex element 164 bonded between the upper liner 161 and the centering ring 163, and a lower secondary flex element 165 bonded between the lower inner liner 162 and the centering ring 163.

To facilitate partial disassembly, the cylindrical body 152 is fastened to the lower support ring 151 by a series of bolts 168, and the attachment flange 158 is fastened to the cylindrical body by a series of bolts 169.

Figure 9:
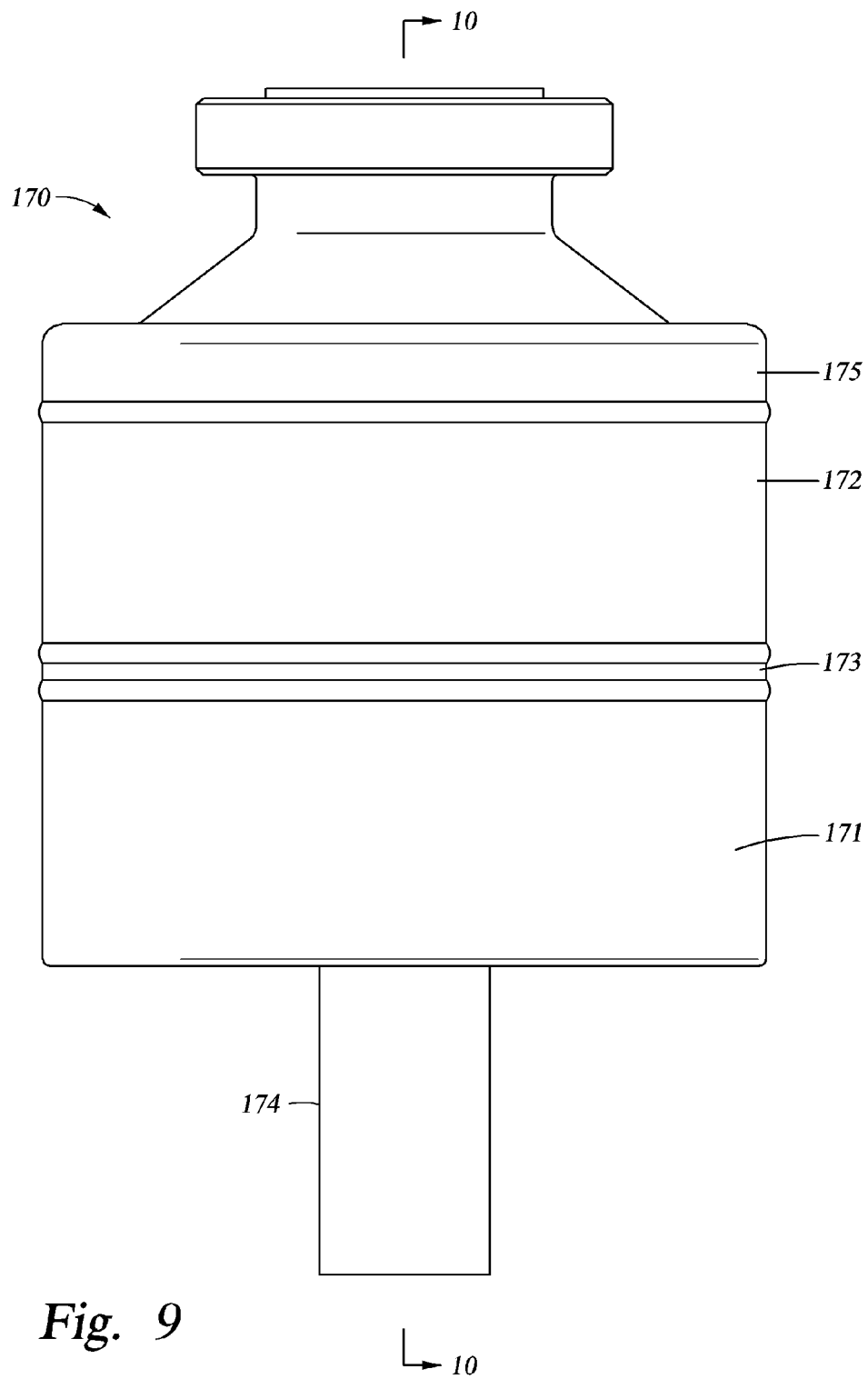
FIG. 9 is a front view of a second configuration of a flexible pipe joint in accordance with the present invention.

FIG. 9 shows a flexible pipe joint 170 having a second configuration in accordance with the present invention. In this example, a lower body 171 and an upper body 172 provide an outer housing for the flexible pipe joint 170. A mid-body support 173 is disposed between the lower body 171 and the upper body 172. An extension pipe 174 extends from the lower body 171, and an attachment flange 175 is mounted to the upper body 172. These components, for example, are made of a corrosion resistant steel alloy.

Figure 10:
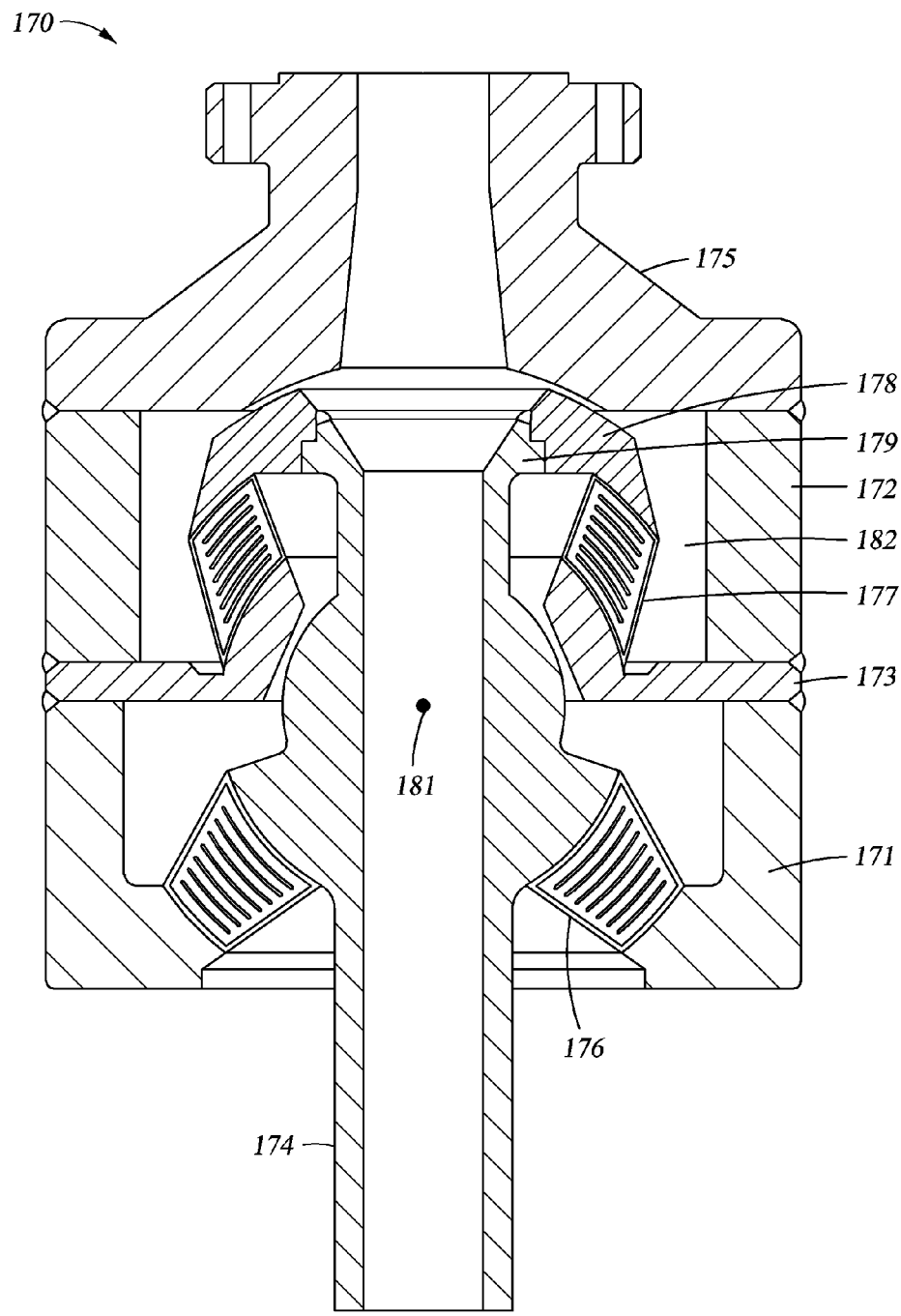
FIG. 10 shows a lateral cross-section along line 10-10 in FIG. 9.

FIG. 10 shows a lateral cross-section of the flexible pipe joint 170. In this example, the mid-body support 173 is welded to the lower body 171, the upper body 172 is welded to the mid-body support 173, and the attachment flange 175 is welded to the upper body 172. A lower annular elastomeric flex element 176 is bonded to the lower body 171 and to the extension pipe 174 to mount the extension pipe 174 to the lower body 171. An upper annular elastomeric flex element 177 is bonded to the mid-body support 173 and to an upper flex element cap 178. The upper flex element cap 178, for example, is made of a corrosion resistant steel alloy. The upper flex element cap 178 is welded to an upper flange 179 of the extension pipe 174. The lower flex element 176 and the upper flex element 177 share a common center of rotation 181, so as to allow an unbinding angular displacement of the of the extension pipe 174 about the common center of rotation.

In this second configuration, the lower flex element 176 and the upper flex element 177 are on opposite sides of the common center of rotation 181, and both the lower flex element and the upper flex element encircle the extension pipe 174. Because the extension pipe 174 and the upper flex element cap 178 are joined together, the lower flex element 176 and the upper flex element 177 are forced to displace and rotate the same amount. Therefore, the total load on the flexible pipe joint 170 (due to riser tension and rotation, fluid pressure, and thermal expansion) is distributed between the lower flex element 176 and the upper flex element 177 in proportion to their relative stiffnesses. The lower flex element 176 transfers its load directly into the lower body 171, while the upper flex element 177 transfers its load through the mid-body support 173 into the lower body 171.

In use, when transferring production fluid from a floating vessel through the flexible pipe joint 170 to an export riser including the extension pipe 174, the production fluid flows down through the attachment flange 175 and fills an upper inner cavity 182. The production fluid flows into the upper flex element cap 178 and then down thorough the extension pipe 174.

It is also possible to use the flexible pipe joint 170 in a production riser including the extension pipe 174. In this case, the production fluid from a well bore would flow up through the extension pipe 174, and then up through the upper flex element extension cap 178 and up through the attachment flange 175.

During manufacture of the flexible pipe joint 170, when the lower flex element 176 is molded, elastomer of the lower flex element becomes bonded to the lower body 171 and to the extension pipe 174. A conventional two-piece mold clamped between the extension pipe 174 and the lower body 171 provides an annular cavity for containing elastomer material and reinforcements during the process of molding the lower flex element 176. When the upper flex element 177 is molded, elastomer of the upper flex element becomes bonded to the mid-body support 173 and to the upper flex element cap 178. In this case a sacrificial or collapsible two-piece mold clamped between the upper flex element cap 178 and the mid-body support 173 provides an annular cavity for containing elastomer material and reinforcements during the process of molding the upper flex element 177. Then the assembly of the upper flex element 177 (bonded to the mid-body support 173 and the upper flex element cap 178) is fitted onto the assembly of the lower flex element 176 (bonded to the lower body 171 and the extension pipe 174). Then the upper flex element cap 178 is welded to the upper flange 179 of the extension pipe 174, and the mid-body support 173 is welded to the lower body 171. Then the upper body 172 is welded to the mid-body support 173, and the attachment flange 175 is welded to the upper body 172.

Figure 11:
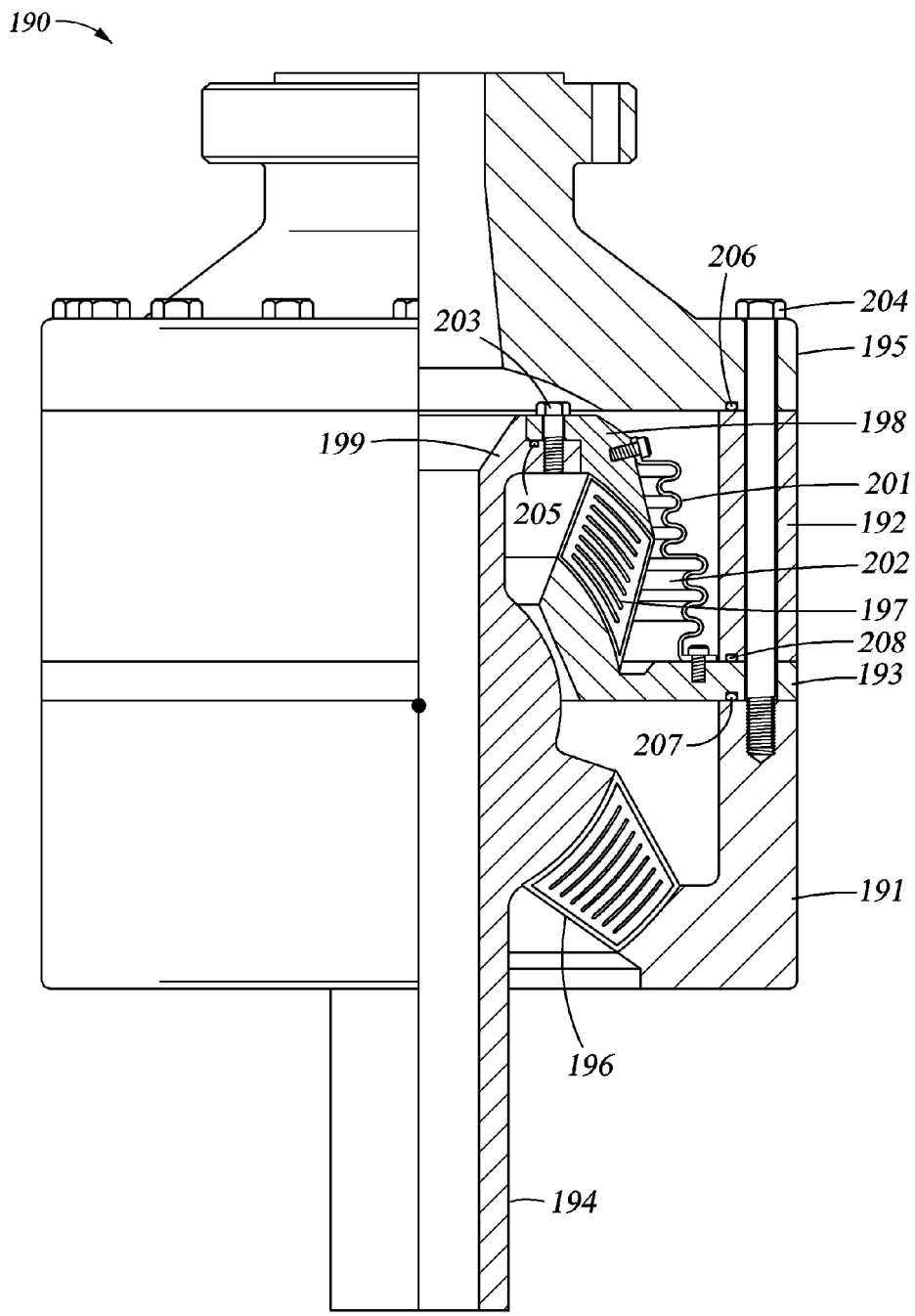
FIG. 11 shows an alternative construction for the flexible pipe joint of FIG. 10 to facilitate disassembly.

FIG. 11 shows a flexible pipe joint 190 having the second configuration as introduced in FIG. 10 but constructed to facilitate disassembly. The flexible pipe joint 190 has a lower body 191, an upper body 192, a mid-body support 193, an extension pipe 194, and an attachment flange 195. A lower annular elastomeric flex element 196 is bonded to the lower body 191 and to the extension pipe 194, and an upper annular elastomeric flex element 197 is bonded to the mid-body support 193 and to an upper flex element cap 198.

Disassembly of the flexible pipe joint 190 may be desired for replacement of an internal bellows 201. The bellows 201 provides a non-diffusive barrier between production fluid conveyed through the flexible pipe joint 190 and elastomer of the upper flex element 197.

To facilitate disassembly, instead of welding the metal parts together, a series of bolts 203 fasten the upper flex element cap 198 to the upper flange 199 of the extension pipe 194, and a series of bolts 204 fasten the attachment flange 195, the upper body 192, and the mid-body support 193 to the lower body 191. An end ring metal gasket 205 seals the joint between the upper flex element cap 198 and the upper flange 199 of the extension pipe 194. An end ring metal gasket 206 seals the joint between the attachment flange 195 and the upper body 192. An end ring metal gasket 207 seals the joint between the upper body 192 and the mid-body support 193. An end ring metal gasket 208 seals the joint between the mid-body support 193 and the lower body 191.

During fabrication of the flexible pipe joint 190, the lower flex element 196 is molded and bonded to the lower body 191 and to the extension pipe 194. The upper flex element 197 is molded and bonded to the mid-body support 193 and to the upper flex element support cap 198. Then the bellows 201 is attached to the mid-body support 193 and to the upper flex element cap 198. Then the cavity 202 between the bellows 201 and the upper flex element 197 is filled with an incompressible fluid such as propylene glycol or polyalkylene glycol. Then the end ring metal gasket 205 is placed on the upper flange 199 of the extension pipe 194, the end ring metal gasket 208 is placed on the lower body 191, and the assembly of the upper flex element 197 is fitted over the upper flange 199 of the extension pipe 194 and secured in place by the bolts 203. Then the end ring metal gasket 207 is placed on the mid-body support 193, and the upper body 192 is placed on the mid-body support. Then the end ring metal gasket 206 is placed on the upper body 192, and the attachment flange 195 is placed upon the upper body 192 and secured in place by the bolts 204.

Figure 12:
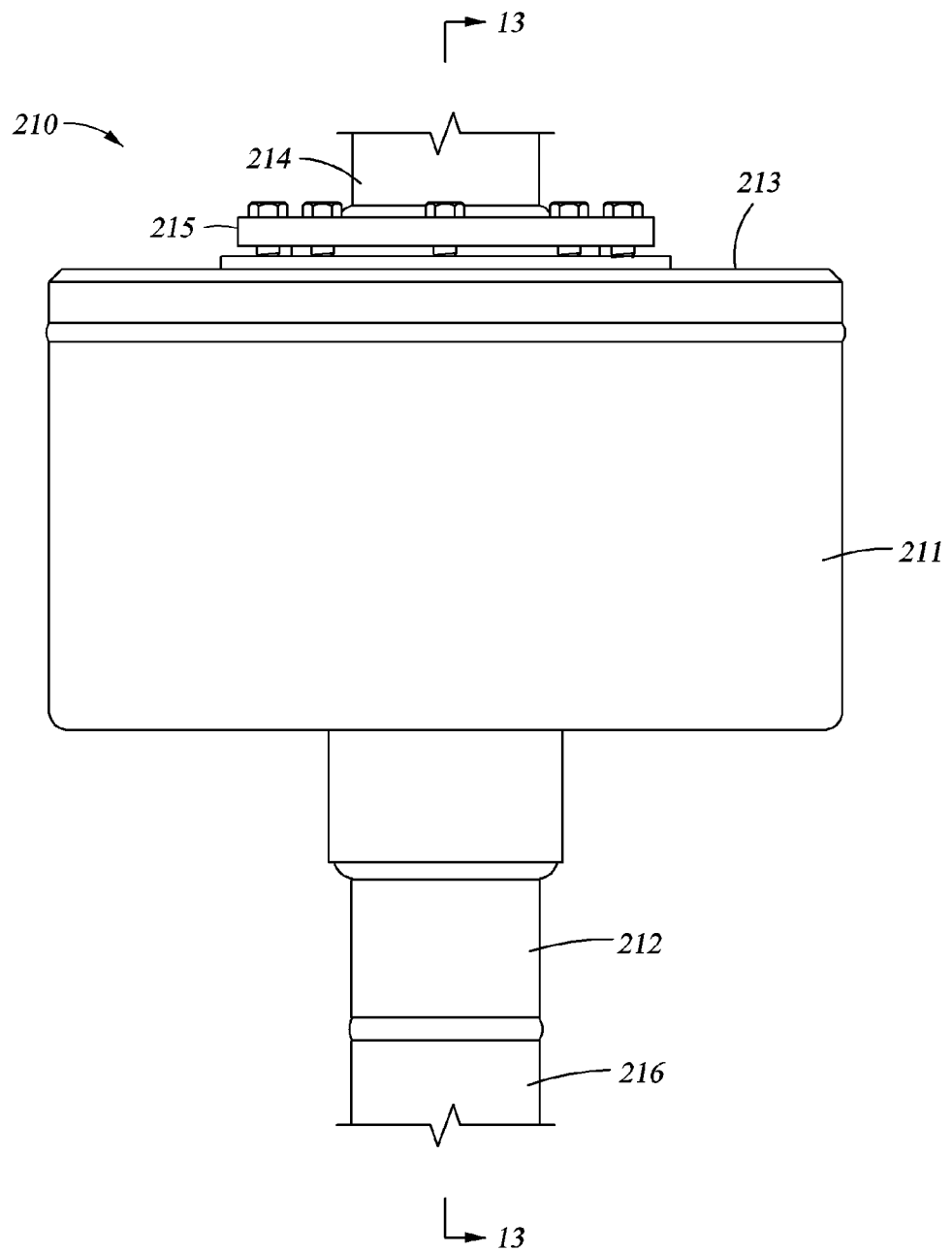
FIG. 12 is a front view of a third configuration of a flexible pipe joint in accordance with the present invention.

FIG. 12 shows a flexible pipe joint 210 having a third configuration in accordance with the present invention. The flexible pipe joint 210 has an outer housing 211, an extension pipe 212, and an attachment flange 213. To couple the flexible pipe joint 210 to an inlet pipe 214, a flange 215 of the inlet pipe is bolted to the attachment flange 213. To couple the flexible pipe joint 210 to a riser 216, the extension pipe 212 is welded to the riser. These components, for example, are made of a corrosion resistant steel alloy.

Figure 13:
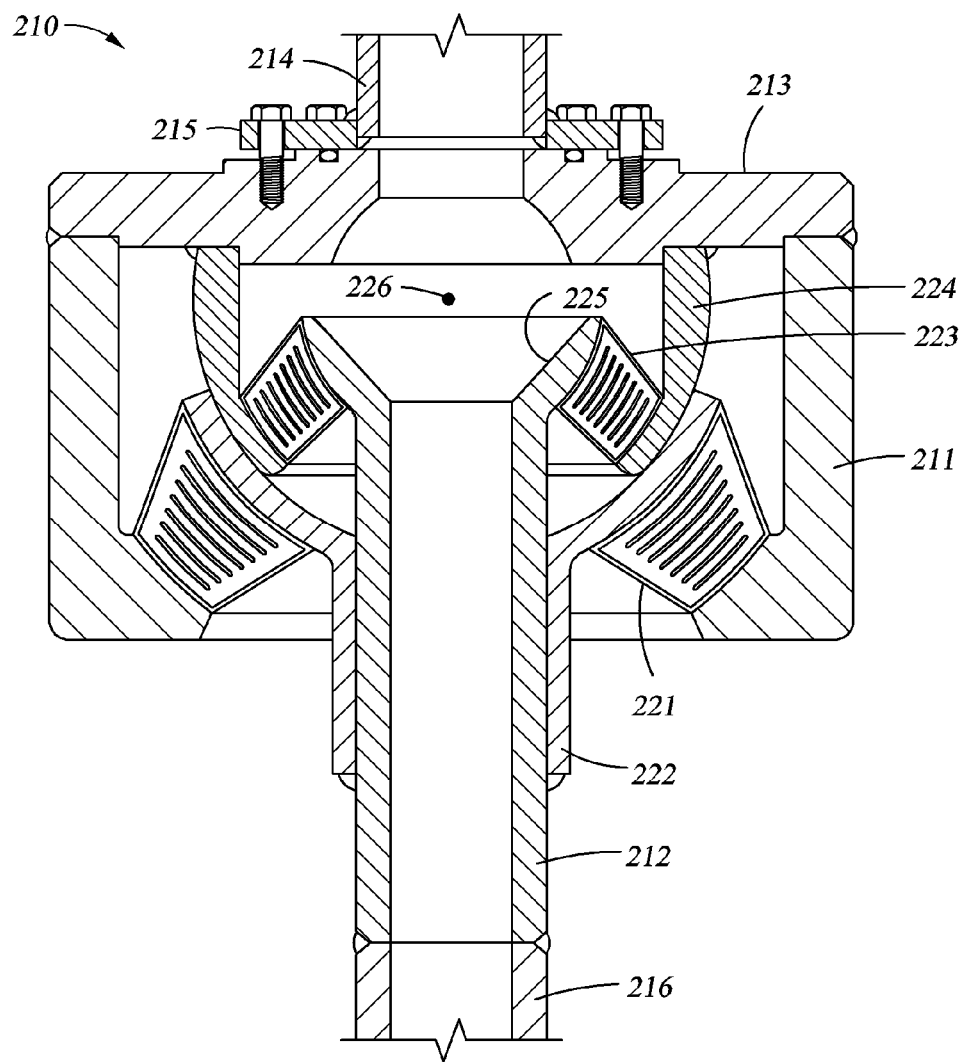
FIG. 13 shows a lateral cross-section along line 13-13 in FIG. 12.

FIG. 13 shows a lateral cross-section of the flexible pipe joint 210. In this example, the attachment flange 213 is welded to the outer housing 211. A lower annular elastomeric flex element 221 is bonded to the outer housing 211 and to an extension jacket 222. An upper annular elastomeric flex element 223 is bonded to an inner housing 224 and to an upper flange 225 of the extension pipe 212. The inner housing 224 and the extension jacket 222, for example, are made of a corrosion resistant steel alloy. The inner housing 224 is welded to the attachment flange 213, and the extension jacket 222 is welded to the extension pipe 212. The lower flex element 221 and the upper flex element 223 share a common center of rotation 226, so as to allow a range of unbinding angular displacement of the extension pipe 212 by rotation about the common center of rotation of the flex elements.

In this third configuration, the lower flex element 221 and the upper flex element 223 are on the same side of the common center of rotation 226, and both the lower flex element and the upper flex element encircle the extension pipe 212. To use similar flex elements in this case, the upper flex element 223 closer to the common center of rotation 226 is nested within the lower flex element 221 such that a portion of the upper flex element 223 is located between the common center of rotation 226 and a portion of the lower flex element 221. Because the extension pipe 212 and the extension jacket 222 are joined together, the lower flex element 221 and the upper flex element 223 are forced to displace and rotate the same amount. Therefore, the total load on the flexible pipe joint 210 (due to riser tension and rotation, fluid pressure, and thermal expansion) is distributed between the lower flex element 221 and the upper flex element 223 in proportion to their relative stiffnesses. The lower flex element 221 transfers its load directly into the outer housing 211, while the upper flex element 223 transfers its load through the inner housing 224 to the attachment flange 213 and from the attachment flange down to the outer housing.

In use, when transferring production fluid from a floating vessel through the flexible pipe joint 210 to an export riser, the production fluid flows from the inlet pipe 214 down through the attachment flange 213 down through the extension pipe 212 to the riser 216.

It is also possible to use the flexible pipe joint 210 in a production riser. In this case, the production fluid from a well bore would flow up through the riser 216 and up through the extension pipe 212, and then up through the attachment flange 213.

During manufacture of the flexible pipe joint 210, when the lower flex element 221 is molded, elastomer of the lower flex element becomes bonded to the outer housing 211 and to the extension jacket 222. A conventional two-piece mold clamped between the extension jacket 222 and the outer housing 211 provides an annular cavity for containing elastomer material and reinforcements during the process of molding the lower flex element 221. When the upper flex element 223 is molded, elastomer of the upper flex element becomes bonded to the inner housing 224 and to the upper flange 225 of the extension pipe 212. A conventional two-piece mold clamped between the upper flange 225 and the inner housing 224 provides an annular cavity for containing elastomer material and reinforcements during the process of molding the upper flex element 223. Then the attachment flange 213 is fitted on the inner housing 224 and welded to the inner housing. Then the assembly of the attachment flange 213, the inner housing 224, the upper flex element 223, and the extension pipe 212 is fitted onto the assembly of the extension jacket 222, the lower flex element 221, and the outer housing 211. Then the lower end of the extension jacket 222 is welded to the extension pipe 212, and the attachment flange 213 is welded to the outer housing 211.

Figure 14:
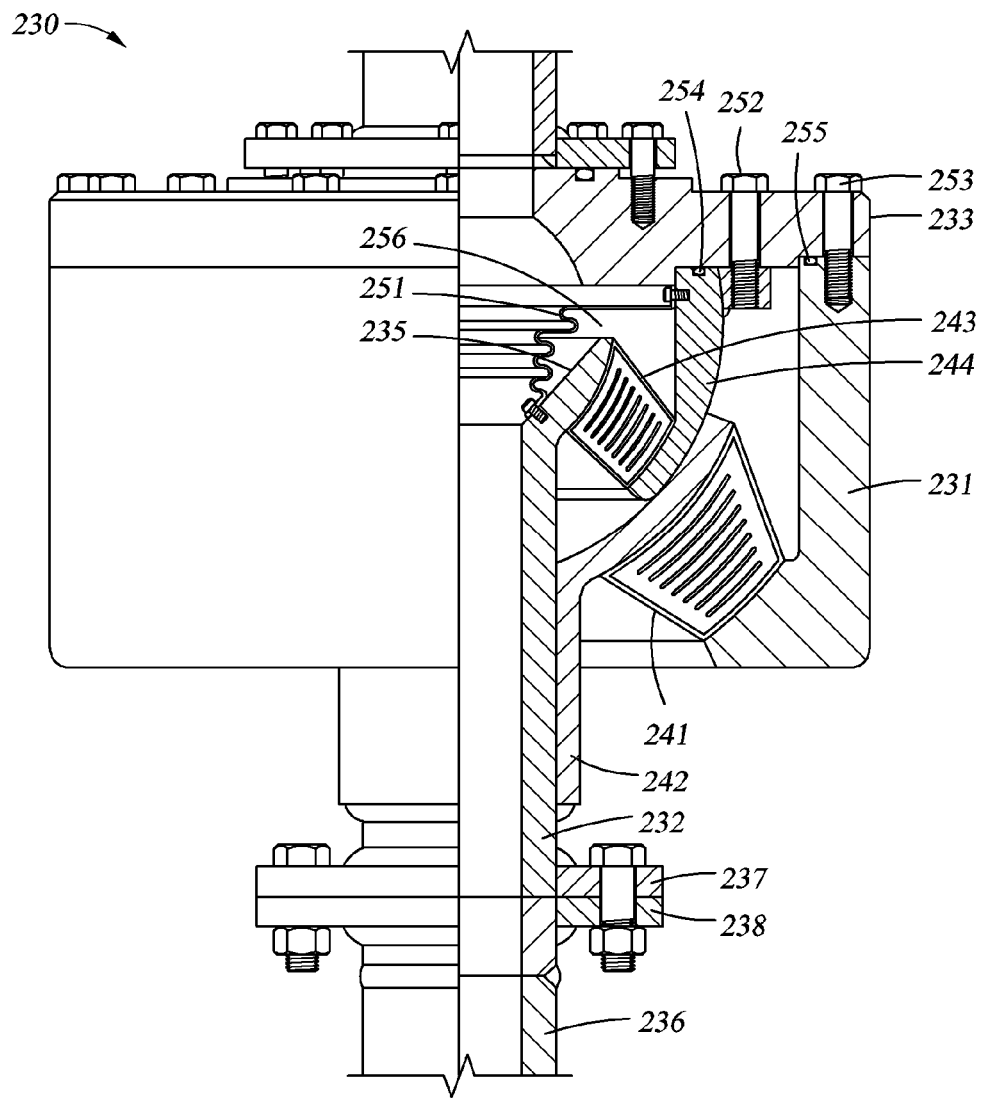
FIG. 14 shows an alternative construction for the flexible pipe joint of FIG. 13 to facilitate disassembly.

FIG. 14 shows a flexible pipe joint 230 having the second configuration as introduced in FIG. 13 but constructed to facilitate disassembly. The flexible pipe joint 230 has an outer housing 231, an extension pipe 232, and an attachment flange 233. A lower annular elastomeric flex element 241 is bonded to the outer housing 231 and to an extension jacket 242. An upper annular elastomeric flex element 243 is bonded to an inner housing 244 and to an upper flange 235 of the extension pipe 232.

Disassembly of the flexible pipe joint 230 may be desired for replacement of an internal bellows 251. The bellows 251 provides a non-diffusive barrier between production fluid conveyed through the flexible pipe joint 230 and elastomer of the upper flex element 243.

To facilitate disassembly, instead of welding many of the metal parts together, a series of bolts 252 fasten the attachment flange 233 to the inner housing 244, and a series of bolts 253 fasten the attachment flange 233 to the outer housing 231. An end ring metal gasket 254 seals the joint between the attachment flange 233 and the inner housing 244. An end ring metal gasket 255 seals the joint between the attachment flange 233 and the outer housing 231. In addition, the flexible joint 230 is attached to the riser 236 by bolting a lower flange 237 of the extension pipe 232 to an upper flange 238 of the riser 236.

During fabrication of the flexible pipe joint 230, the lower flex element 241 is molded and the elastomer of the lower flex element is bonded to the outer housing 231 and to the extension jacket 242. The upper flex element 243 is molded and elastomer of the upper flex element is bonded to the inner housing 244 and to the upper flange 235 of the extension pipe 232. Then the bellows 251 is attached to the inner housing 244 and to the upper flange 235 of the extension pipe 232. Then a cavity 256 between the bellows 251 and the upper flex element 243 is filled with an incompressible fluid such as propylene glycol or polyalkylene glycol. Then the assembly of the upper flex element 243 and the extension pipe 232 is fitted onto the assembly of the extension jacket 242, the lower flex element 241, and the outer housing 231. Then the lower end of the extension jacket 242 is welded to the extension pipe 232. Then the attachment flange 233 is placed upon the inner housing 244 and upon the outer housing 231 and secured in place by the bolts 252 and 253.

Figure 15:
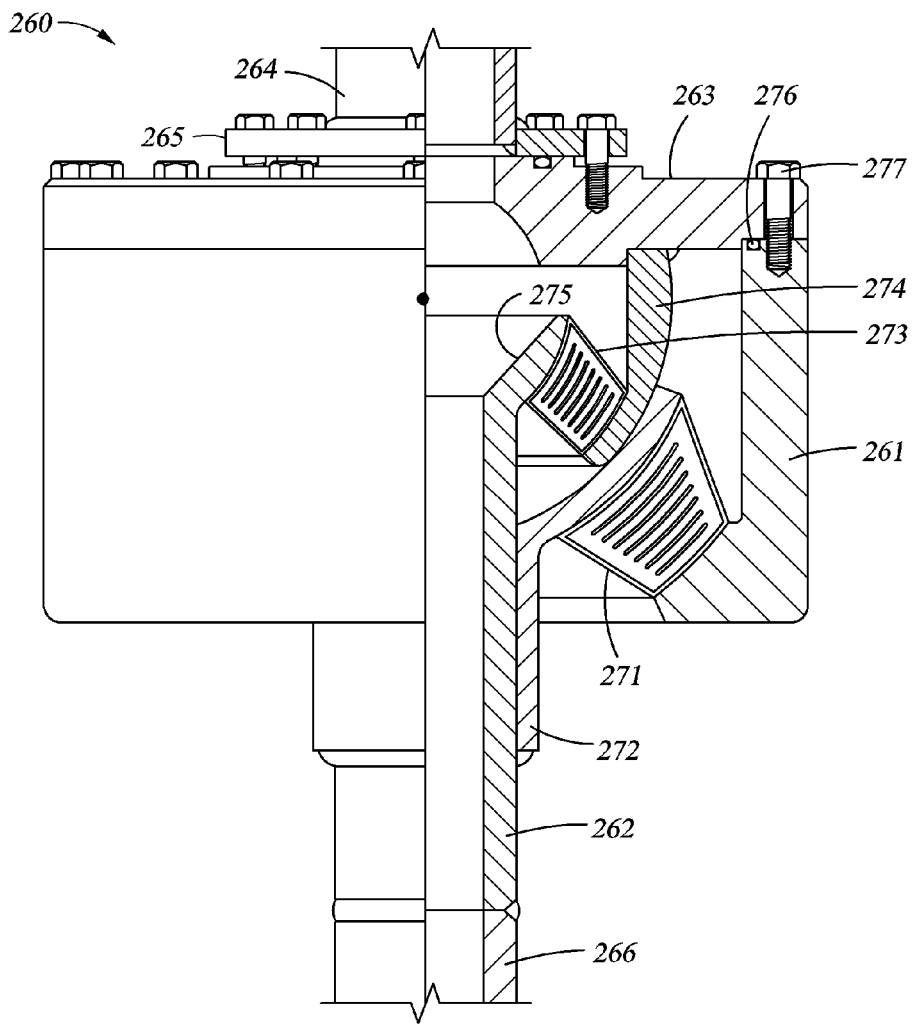
FIG. 15 shows another alternative construction for the flexible pipe joint of FIG. 13.

FIG. 15 shows another flexible pipe joint 260. The flexible pipe joint 260 has an outer housing 261, an extension pipe 262, and an attachment flange 263. To couple the flexible pipe joint 260 to an inlet pipe 264, a flange 265 of the inlet pipe is bolted to the attachment flange 263. To couple the flexible pipe joint 260 to a riser 266, the extension pipe 262 is welded to the riser. A lower annular elastomeric flex element 271 is bonded to the outer housing 261 and to an extension jacket 272. An upper annular elastomeric flex element 273 is bonded to an inner housing 274 and to an upper flange 275 of the extension pipe 262. The inner housing 274 is welded to the attachment flange 263, and the lower end of the extension jacket 272 is welded to the extension pipe 262.

The construction of the flexible pipe joint 260 in FIG. 15 is similar to the flexible pipe joint 210 in FIG. 13, except that the attachment flange 263 is bolted rather than welded to the outer housing 261. Although not necessary during operation, an end ring metal gasket 276 seals the joint between the attachment flange 263 and the outer housing 261, and a series of bolts 277 secure the attachment flange to the outer housing.

Although various embodiments of the invention have been described above as being used as a flexible pipe joint for a riser, it should be understood that these embodiments could also be used as a flexible joint for a tendon. In this case, the tendon would be welded or otherwise secured to the extension pipe. Typically there would be no need for conveying fluid through the flexible joint to or from the tendon, so that the aperture in the attachment flange could be covered by a plate, or a cover plate or cap without an aperture could be mounted to the outer housing of the flexible joint in lieu of the attachment flange.

In view of the above, there has been described a flexible joint having an extension mounted to a housing for angular displacement of the extension with respect to the housing. Two or more annular elastomeric flex elements are stacked in a co-axial fashion and joined mechanically to mount the extension to the housing so that the flex elements react in parallel to angular and axial displacements of the extension with respect to the housing such that, in particular, tensile load upon the extension places each of the flex elements in compression to split and share the tensile load among the flex elements in proportion to their relative axial stiffnesses. Therefore, for a given housing size or footprint, the overall load capacity is increased, and the usable lifetime of the flexible joint is increased for a given load capacity. The flex elements may be of different size or composition, and may have a common center of rotation; and the flex elements may be disposed either on the same side of the center of rotation or on opposite sides.

What is claimed is:

1. A flexible joint comprising:
    an outer housing;
    an extension extending from the outer housing;
    a first annular elastomeric flex element mounting the extension to the outer housing for angular displacement of the extension with respect to the outer housing; and
    at least a second annular elastomeric flex element coupled between the extension and the outer housing;
    wherein the first and second flex elements are stacked in a coaxial fashion and are mechanically joined so that the first and second flex elements react in parallel to both angular and axial displacements of the extension with respect to the outer housing so that tensile load upon the extension with respect to the outer housing places each of the first and second flex elements in compression to split and share the tensile load among the first and second flex elements in proportion to relative axial stiffnesses of the first and second flex elements.

2. The flexible joint as claimed in claim 1, wherein the extension is a pipe, the outer housing has a first end and a second end, the extension extends from the second end of the outer housing, the flexible pipe joint further includes an attachment flange mounted to the first end of the outer housing, and the attachment flange defines an aperture of a channel through the outer housing and through the first and second flex elements for passage of fluid to or from the extension.

3. The flexible joint as claimed in claim 2, wherein:
    the first flex element is disposed within the outer housing;
    the extension passes through the first flex element so that the first flex element encircles the extension;
    the second flex element is disposed within the outer housing; and
    the extension passes through the second flex element so that the second flex element encircles the extension.

4. The flexible joint as claimed in claim 3, wherein elastomer of the first flex element is bonded to the extension and bonded to a piece of the outer housing, and elastomer of the second flex element is bonded to a cap and bonded to a mid-body support, the cap is affixed to the extension, and the mid-body support is disposed between pieces of the outer housing.

5. The flexible joint as claimed in claim 3, wherein elastomer of the first flex element is bonded to the extension and bonded to an inner housing affixed to the attachment flange, the first flex element is disposed within the inner housing, elastomer of the second flex element is bonded to a piece of the outer housing and bonded to an extension jacket, the extension jacket passes through the second flex element so that the second flex element encircles the extension jacket, and the extension jacket is affixed to the extension.

6. The flexible joint as claimed in claim 5, wherein the extension jacket is welded to the extension.

7. The flexible joint as claimed in claim 1, wherein the first flex element is substantially identical to the second flex element so that the relative axial stiffness of the first flex element is substantially equal to the relative axial stiffness of the second flex element and each of the first and second flex elements carries about one half of the tensile load upon the extension with respect to the outer housing.

8. The flexible joint as claimed in claim 1, wherein the first flex element and the second flex element have a common center of rotation.

9. The flexible joint as claimed in claim 8, wherein the common center of rotation is located between the first flex element and the second flex element.

10. The flexible joint as claimed in claim 9, wherein a mechanical connection of the second flex element to the outer housing passes through the second flex element so that the mechanical connection is encircled by the second flex element.

11. The flexible joint as claimed in claim 9, wherein the extension passes through the second flex element for connection to the second flex element so that the extension is encircled by the second flex element.

12. The flexible joint as claimed in claim 8, wherein at least a portion of the second flex element is located between the common center of rotation and at least a portion of the first flex element.

13. A flexible joint comprising:
an outer housing;
an extension extending from the outer housing;
a first annular elastomeric flex element mounting the extension to the outer housing for angular displacement of the extension with respect to the outer housing; and
at least a second annular elastomeric flex element coupled between the extension and the outer housing;
wherein the first and second flex elements are stacked in a coaxial fashion and are mechanically joined so that the first and second flex elements react in parallel to both angular and axial displacements of the extension with respect to the outer housing so that tensile load upon the extension with respect to the outer housing places each of the first and second flex elements in compression to split and share the tensile load among the first and second flex elements in proportion to relative axial stiffnesses of the first and second flex elements; and
wherein the extension and the outer housing are made of metal, elastomer of the first flex element is bonded to the extension and bonded to a piece of the outer housing, and elastomer of the second flex element is bonded to a first metal piece and bonded to a second metal piece, and the first metal piece is affixed to the extension, and the second metal piece is affixed to the outer housing.

14. The flexible joint as claimed in claim 13, wherein the first metal piece is welded to the extension, and the second metal piece is welded or bolted to the outer housing.

15. The flexible joint as claimed in claim 13, wherein the first metal piece is an inner housing and the second flex element is disposed within the inner housing, and the second metal piece passes through the second flex element so that the second metal piece is encircled by the second flex element.

16. The flexible joint as claimed in claim 13, wherein the extension passes through the first flex element and through the second flex element so that the first flex element encircles the extension and the second flex element encircles the extension, the extension has a flange attached to the first metal piece, and the second metal piece is disposed between two pieces of the outer housing.

17. The flexible joint as claimed in claim 1, wherein the extension passes through the first flex element and through the second flex element so that the first flex element encircles the extension and the second flex element encircles the extension, the extension and the outer housing are made of metal, elastomer of the first flex element is bonded to the extension and bonded to a first metal piece, and elastomer of the second flex element is bonded to a second metal piece and bonded to a piece of the outer housing, and the first metal piece is affixed to the outer housing, and the second metal piece is affixed to the extension.

18. The flexible joint as claimed in claim 17, wherein the second metal piece is welded to the extension.

19. A flexible pipe joint comprising:
an outer housing having a first end and a second end;
an attachment flange mounted to the first end of the outer housing;
an extension pipe extending from the second end of the outer housing;
a first annular elastomeric flex element disposed within the outer housing and mounting the extension pipe to the outer housing for angular displacement of the extension pipe with respect to the outer housing, the extension pipe passing through the first flex element so that the first flex element encircles the extension pipe;
an inner pipe disposed within the outer housing and mounted to the attachment flange and providing a channel from an aperture in the attachment flange to the extension pipe for passage of fluid through the flexible pipe joint;
an inner housing disposed within the outer housing and affixed to the extension pipe; and
a second annular elastomeric flex element disposed within the outer housing and disposed within the inner housing and mounting the inner pipe to the inner housing, the inner pipe passing through the second flex element so that the second flex element encircles the inner pipe;
wherein the first and second flex elements are stacked in a coaxial fashion and are mechanically joined so that the first and second flex elements react in parallel to angular and axial displacements of the extension pipe with respect to the outer housing so that tensile load upon the extension pipe with respect to the outer housing places each of the first and second flex elements in compression to split and share the tensile load among the first and second flex elements in proportion to relative axial stiffnesses of the first and second flex elements.

20. The flexible pipe joint as claimed in claim 19, wherein elastomer of the first flex element is bonded to the extension pipe and bonded to a piece of the outer housing, and elastomer of the second flex element is bonded to the inner pipe and bonded to the inner housing.

21. A flexible joint comprising:
an outer housing;
an extension extending from the outer housing;
a first annular elastomeric flex element mounting the extension to the outer housing for angular displacement of the extension with respect to the outer housing; and
at least a second annular elastomeric flex element coupled between the extension and the outer housing;

wherein the first and second flex elements are stacked in a coaxial fashion and are mechanically joined so that the first and second flex elements react to both angular and axial displacements of the extension with respect to the outer housing so that tensile load upon the extension with respect to the outer housing places each of the first and second flex elements in compression to split and share the tensile load among the first and second flex elements, and wherein the extension and the outer housing are made of metal, elastomer of the first flex element is bonded to the extension and bonded to a piece of the outer housing, and elastomer of the second flex element is bonded to a first metal piece and bonded to a second metal piece, and the first metal piece is affixed to the extension, and the second metal piece is affixed to the outer housing.

22. The flexible joint as claimed in claim 21, wherein the first metal piece is welded to the extension, and the second metal piece is welded or bolted to the outer housing.

23. The flexible joint as claimed in claim 21, wherein the first metal piece is an inner housing and the second flex element is disposed within the inner housing, and the second metal piece passes through the second flex element so that the second metal piece is encircled by the second flex element.

24. The flexible joint as claimed in claim 21, wherein the extension passes through the first flex element and through the second flex element so that the first flex element encircles the extension and the second flex element encircles the extension, the extension has a flange attached to the first metal piece, and the second metal piece is disposed between two pieces of the outer housing.

25. A flexible pipe joint comprising:
an outer housing having a first end and a second end;
an attachment flange mounted to the first end of the outer housing;
an extension pipe extending from the second end of the outer housing;
a first annular elastomeric flex element disposed within the outer housing and mounting the extension pipe to the outer housing for angular displacement of the extension pipe with respect to the outer housing, the extension pipe passing through the first flex element so that the first flex element encircles the extension pipe;
an inner pipe disposed within the outer housing and mounted to the attachment flange and providing a channel from an aperture in the attachment flange to the extension pipe for passage of fluid through the flexible pipe joint;
an inner housing disposed within the outer housing and affixed to the extension pipe; and
a second annular elastomeric flex element disposed within the outer housing and disposed within the inner housing and mounting the inner pipe to the inner housing, the inner pipe passing through the second flex element so that the second flex element encircles the inner pipe;
wherein the first and second flex elements are stacked in a coaxial fashion and are mechanically joined so that the first and second flex elements react to angular and axial displacements of the extension pipe with respect to the outer housing so that tensile load upon the extension pipe with respect to the outer housing places each of the first and second flex elements in compression to split and share the tensile load among the first and second flex elements.

26. The flexible pipe joint as claimed in claim 25, wherein elastomer of the first flex element is bonded to the extension pipe and bonded to a piece of the outer housing, and elastomer of the second flex element is bonded to the inner pipe and bonded to the inner housing.

* * * * *